Dec. 20, 1938.　　　　　E. J. SVENSON　　　　　2,140,565
MATERIAL WORKING APPARATUS
Filed Jan. 23, 1934　　　11 Sheets-Sheet 3
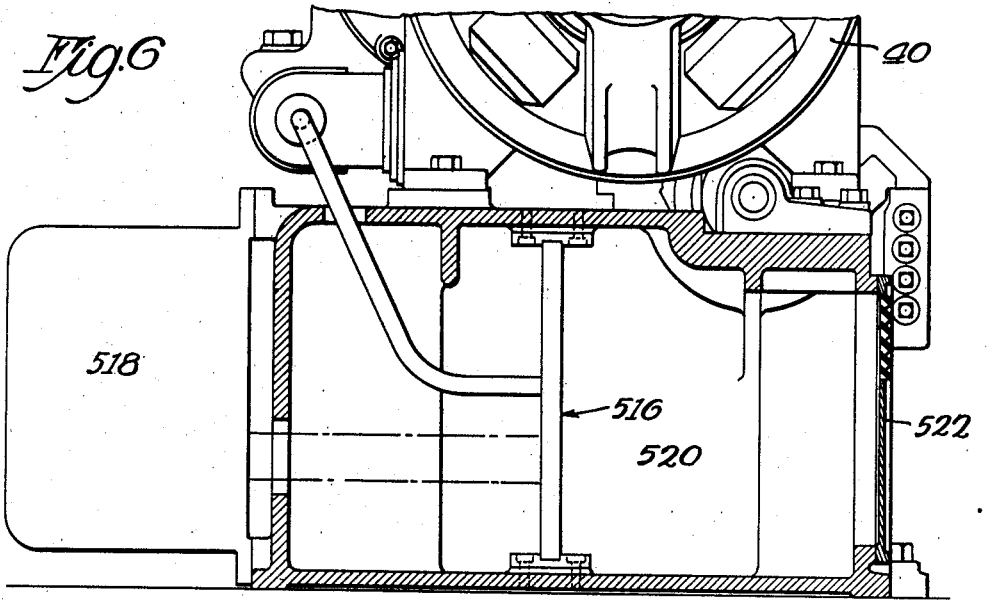
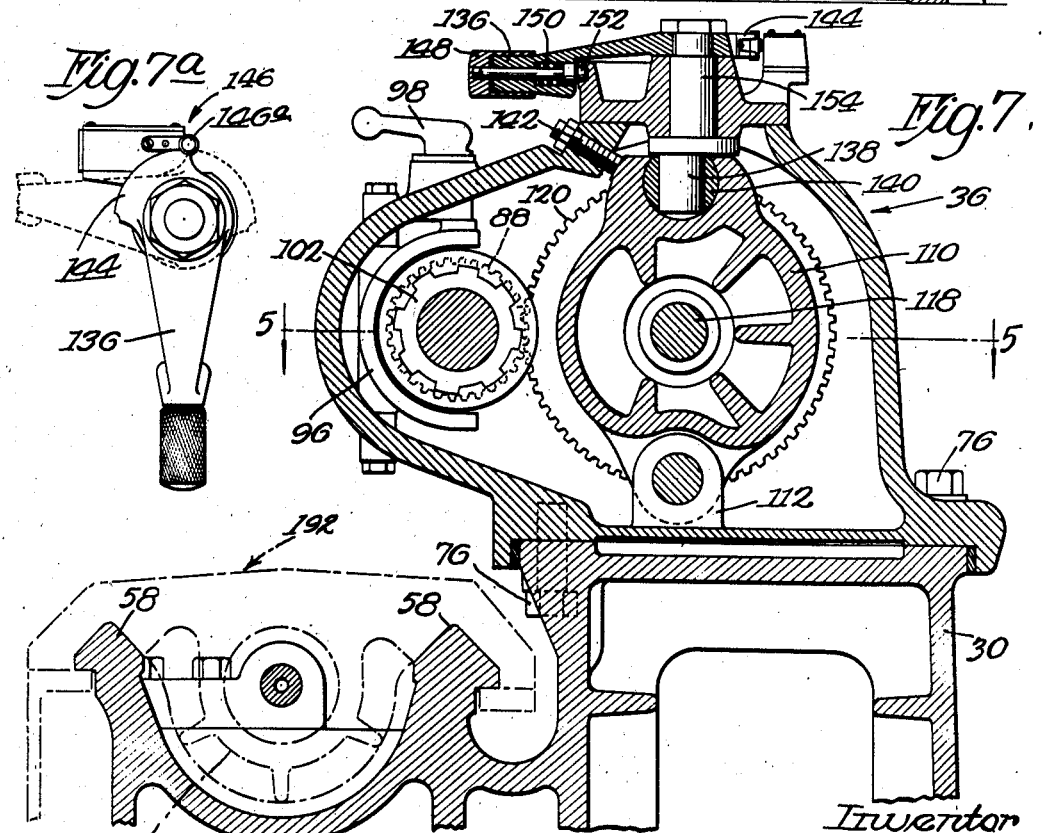
Inventor
Ernest J. Svenson
By Cox & Moore Attys.

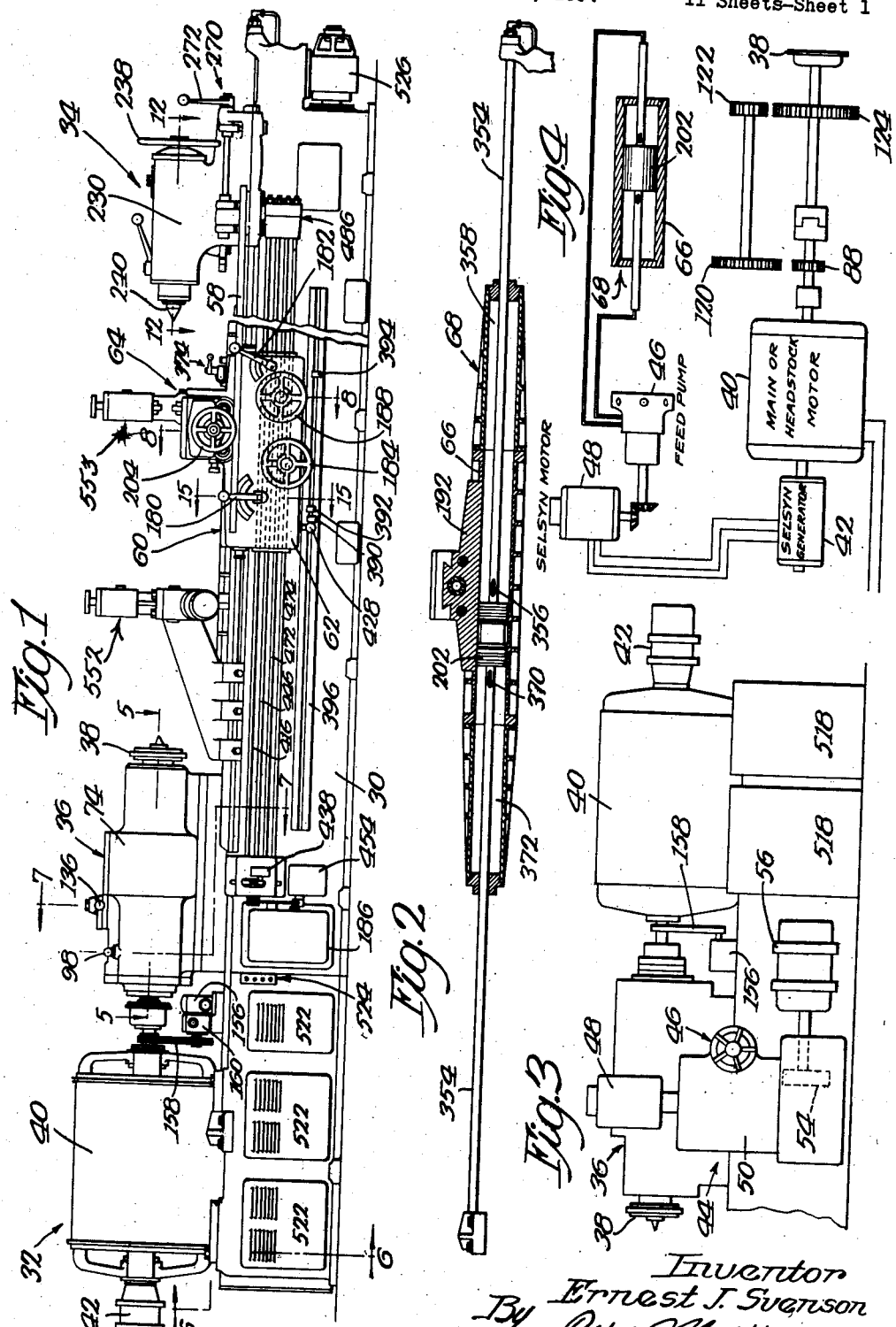

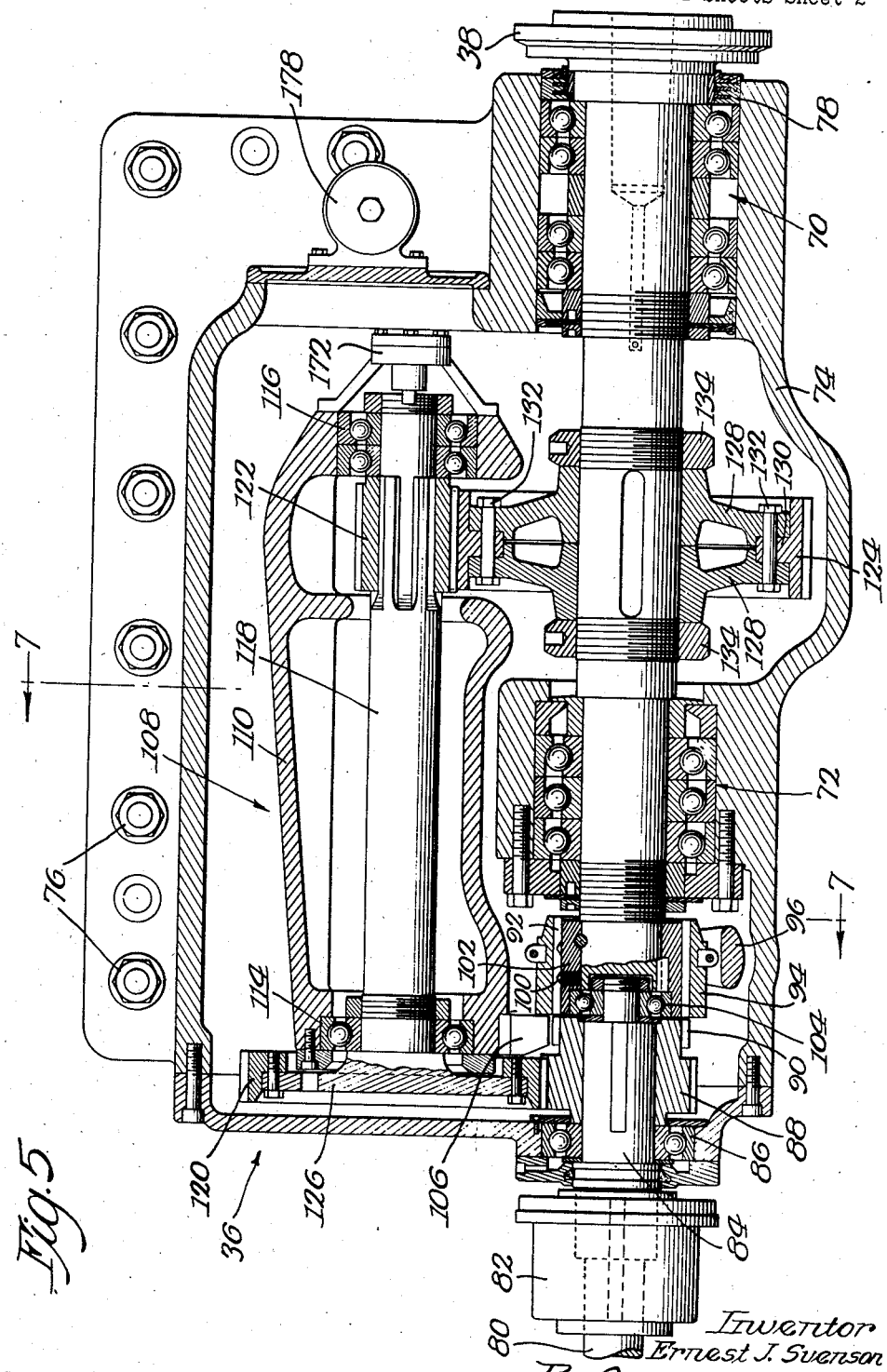

Dec. 20, 1938.  E. J. SVENSON  2,140,565
MATERIAL WORKING APPARATUS
Filed Jan. 23, 1934  11 Sheets-Sheet 4
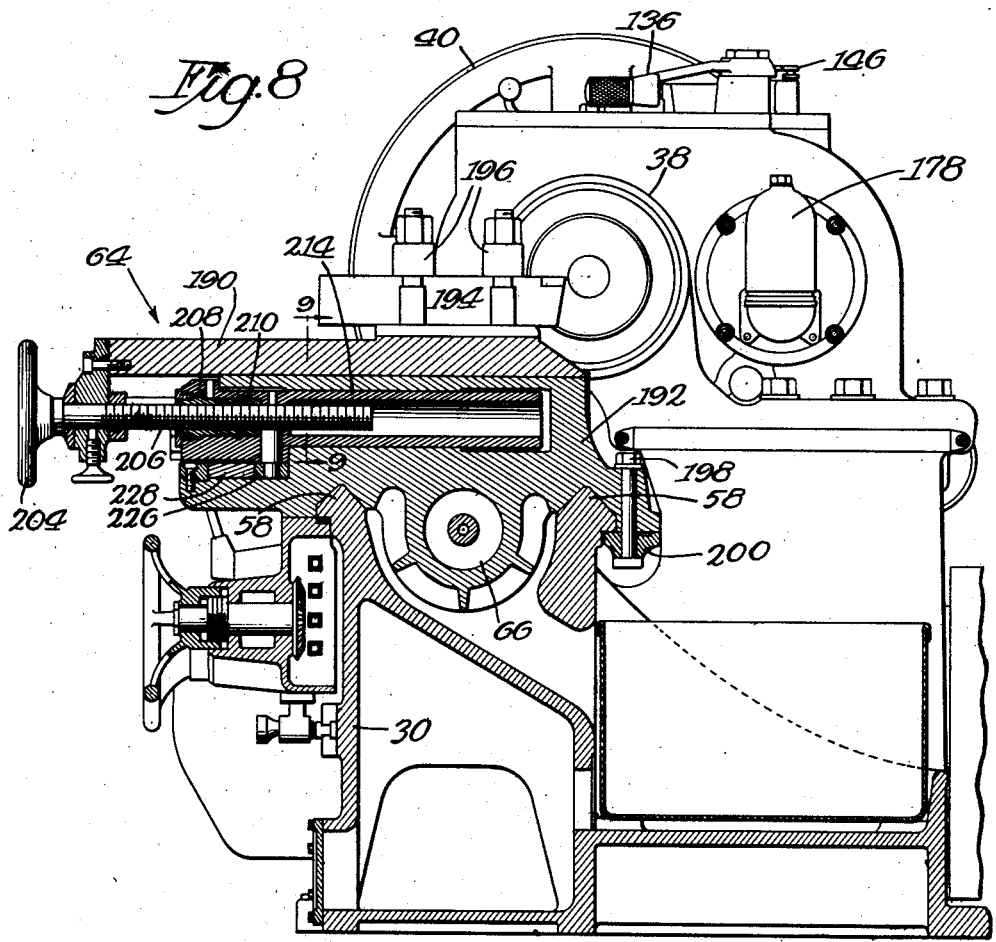
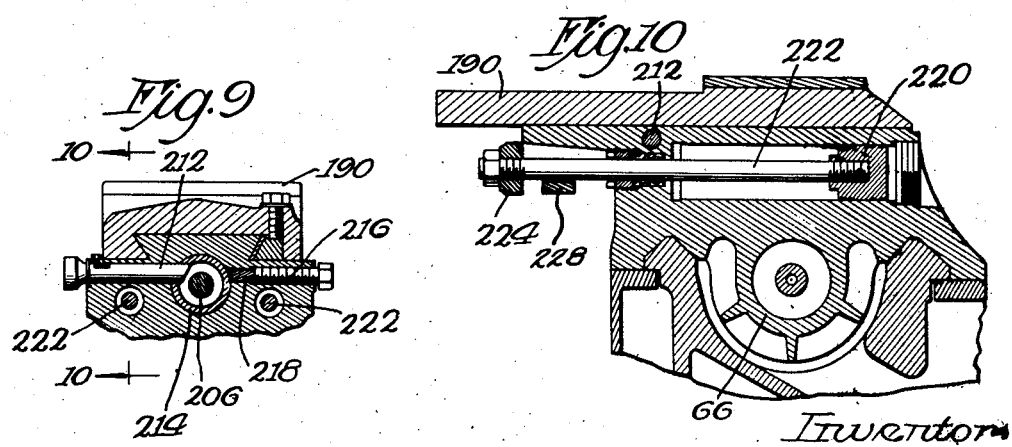

Dec. 20, 1938.  E. J. SVENSON  2,140,565
MATERIAL WORKING APPARATUS
Filed Jan. 23, 1934  11 Sheets-Sheet 5
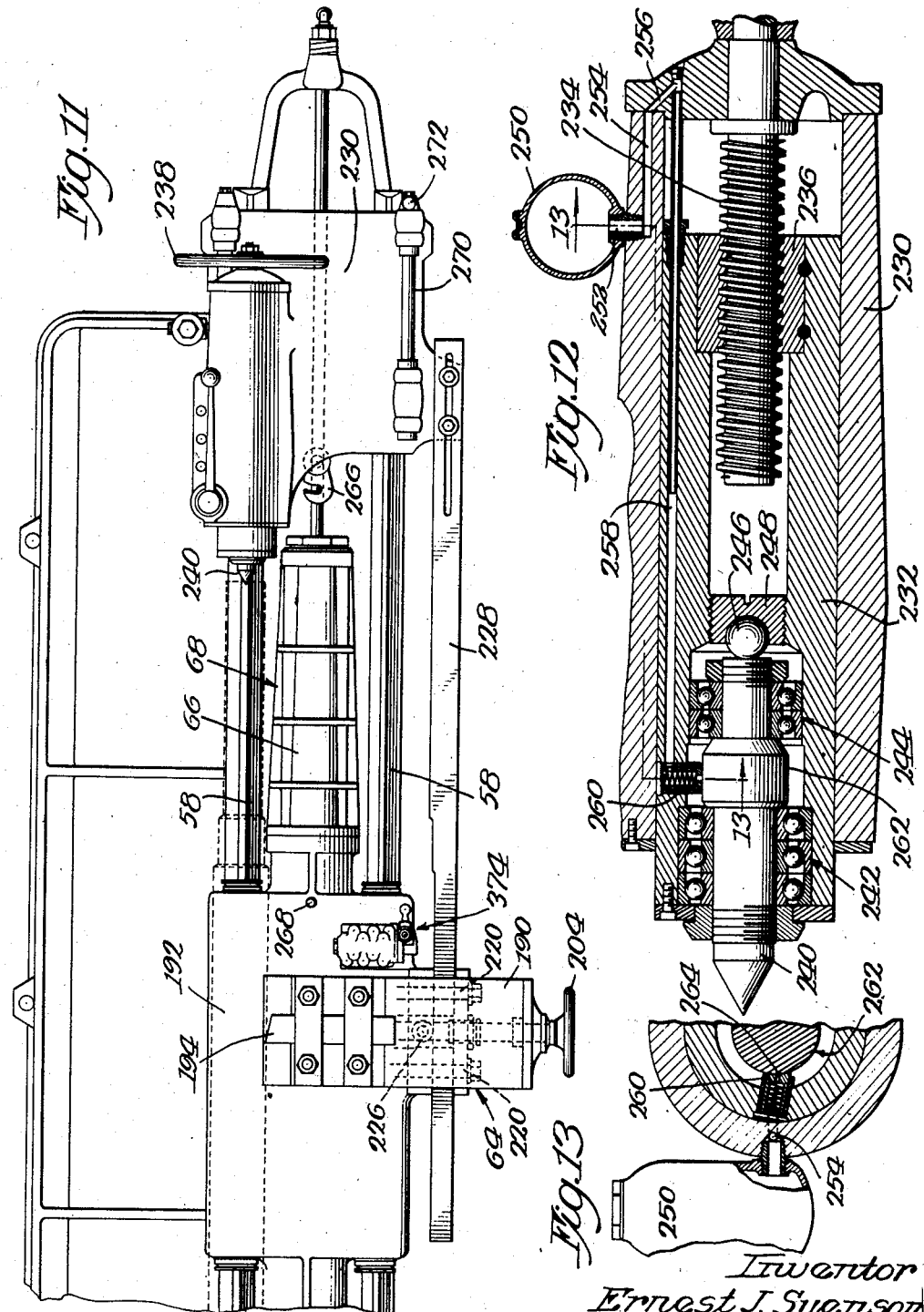
Inventor
Ernest J. Svenson
By Cox & Moore
Attys.

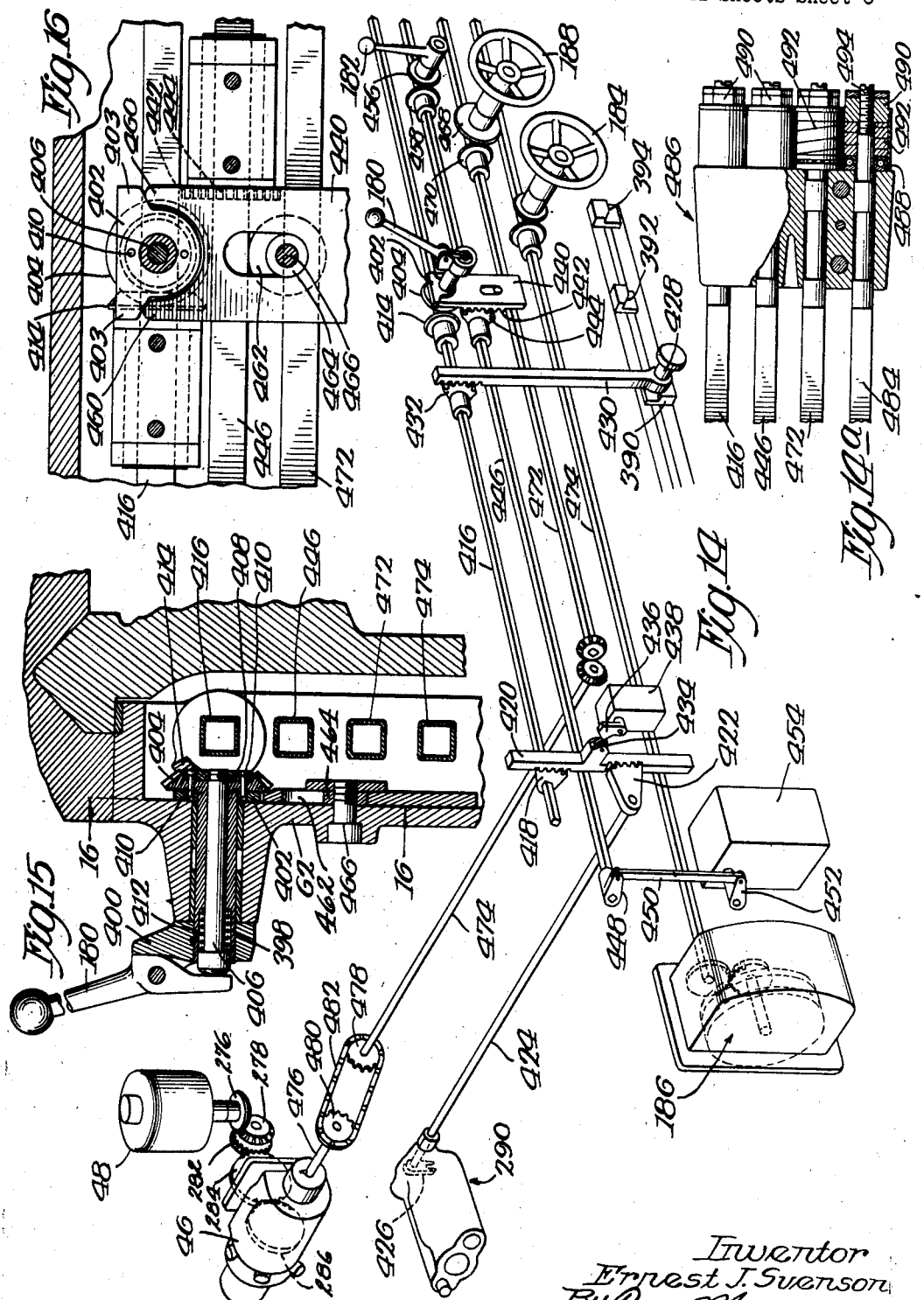

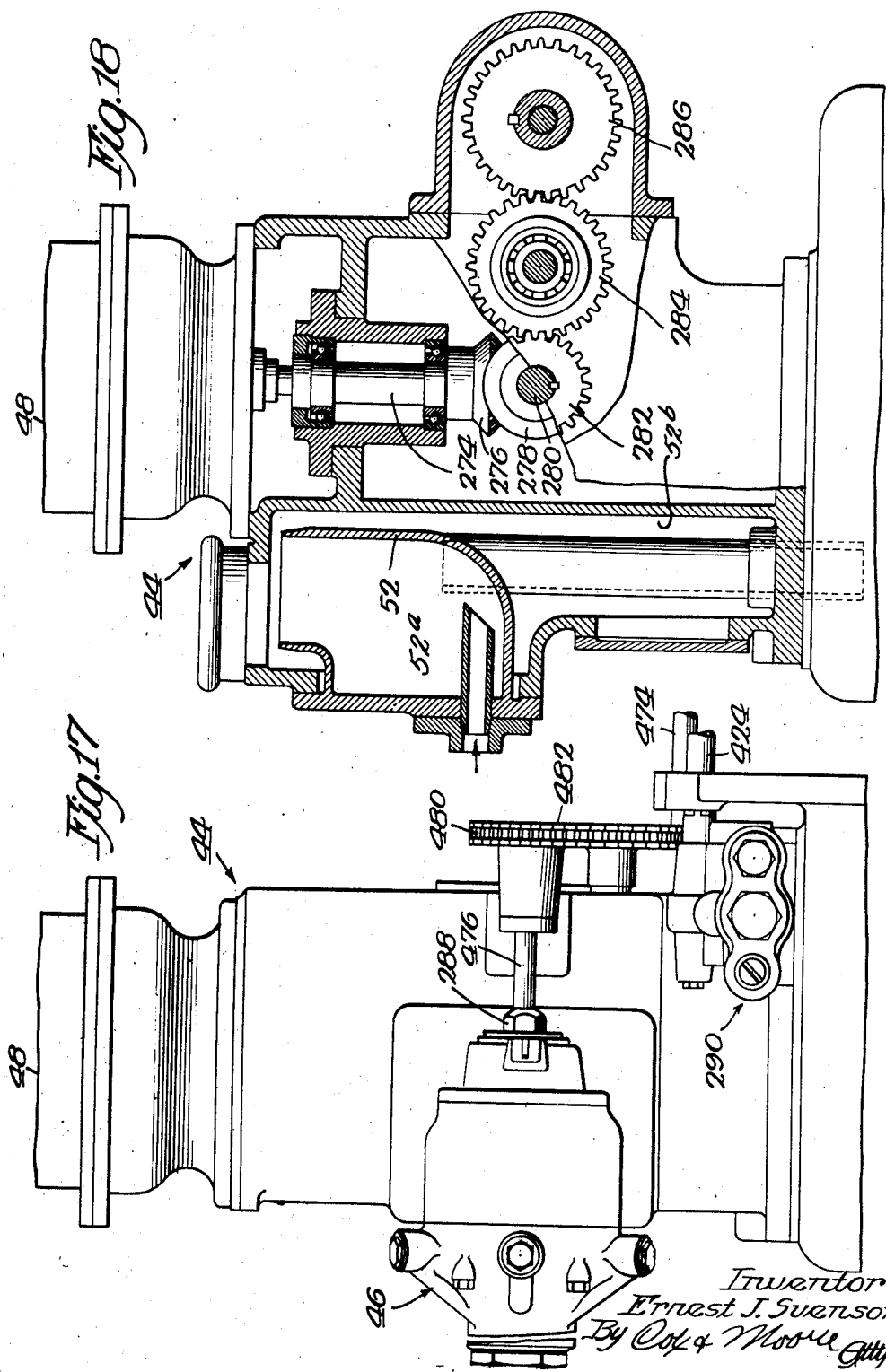

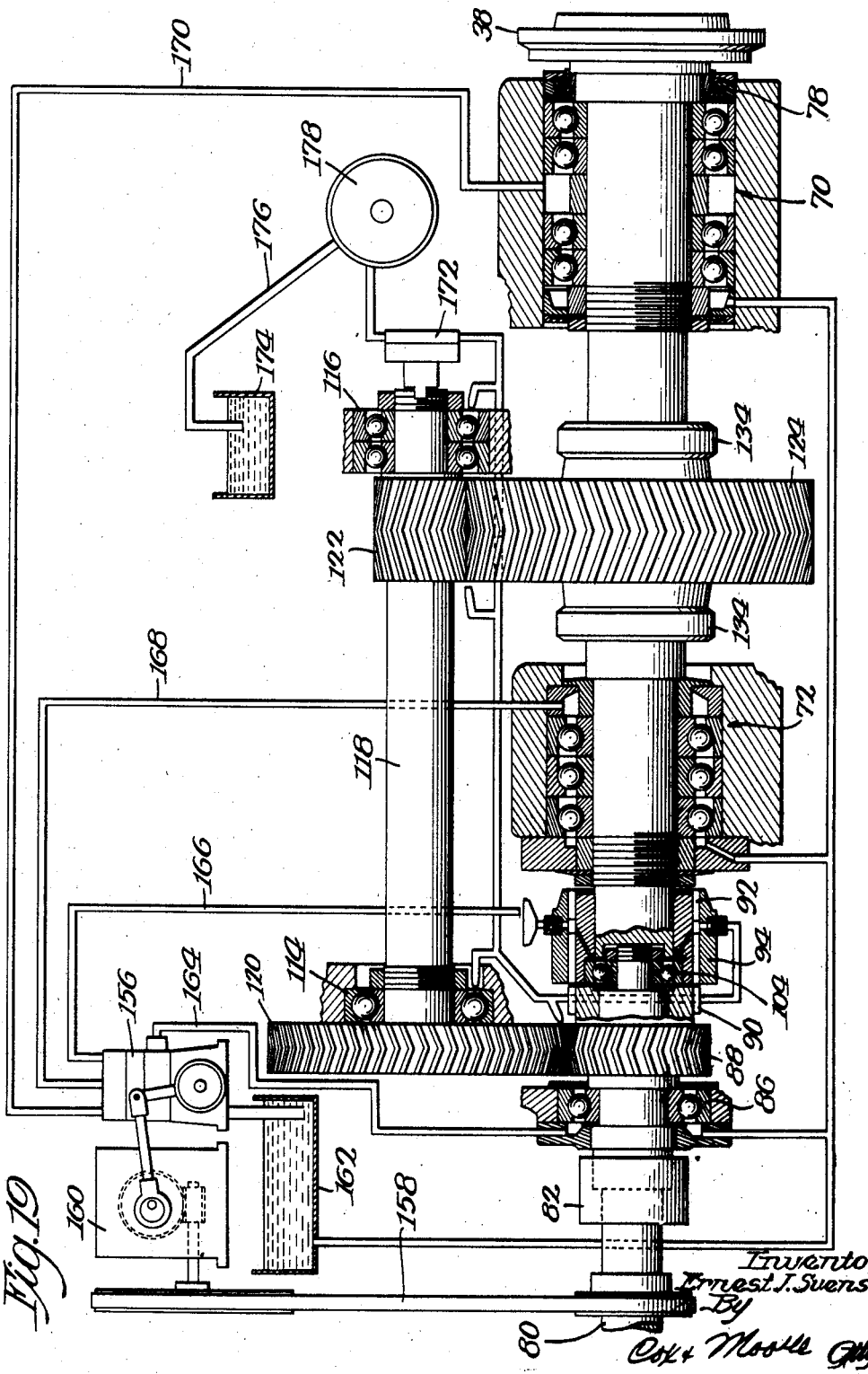

Dec. 20, 1938.  E. J. SVENSON  2,140,565
MATERIAL WORKING APPARATUS
Filed Jan. 23, 1934   11 Sheets-Sheet 9
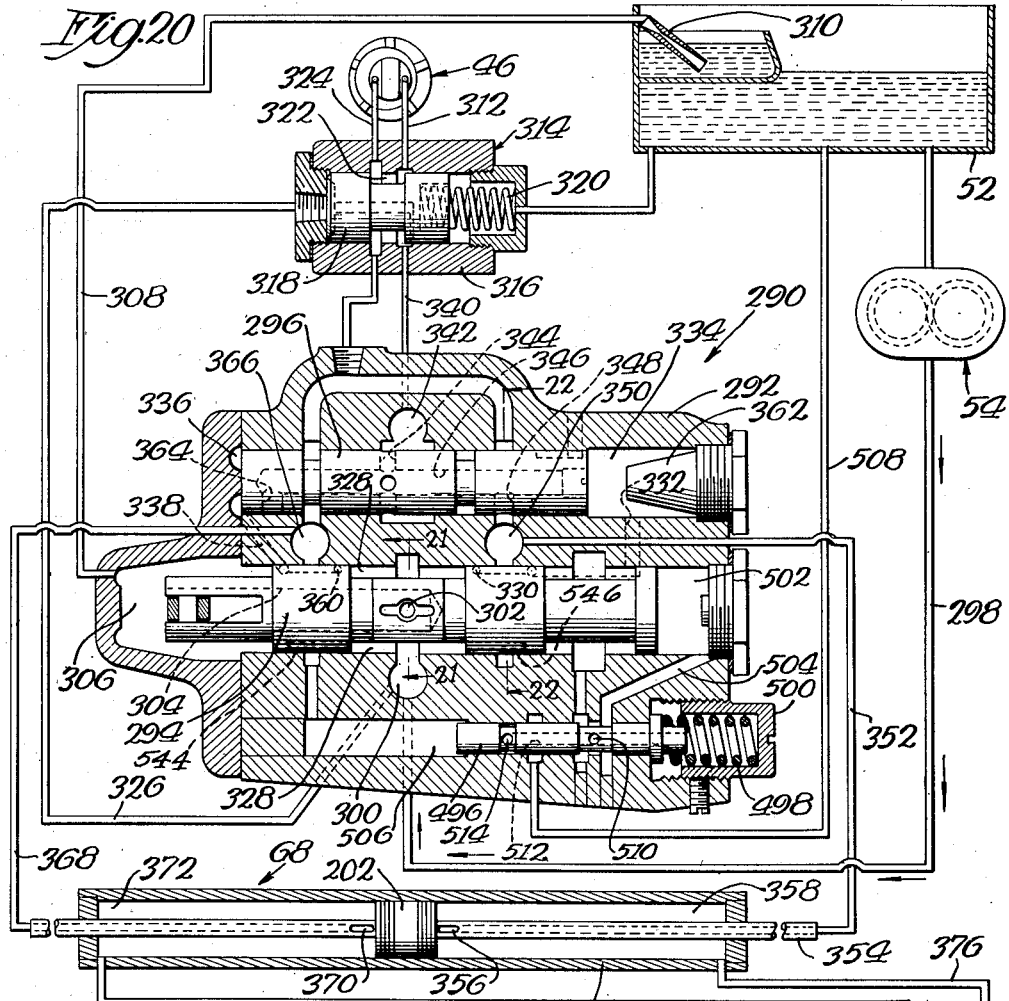
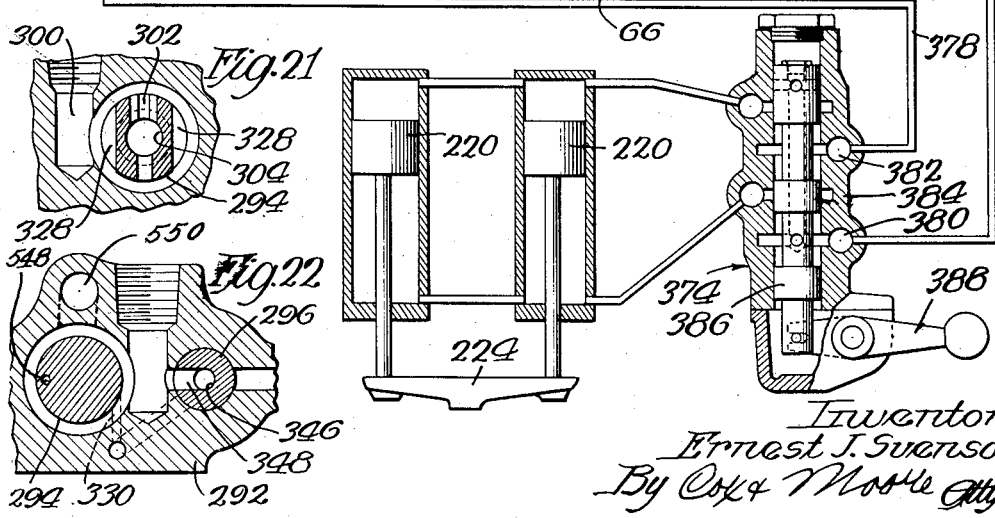
Inventor
Ernest J. Svenson
By Ook & Moore Attys.

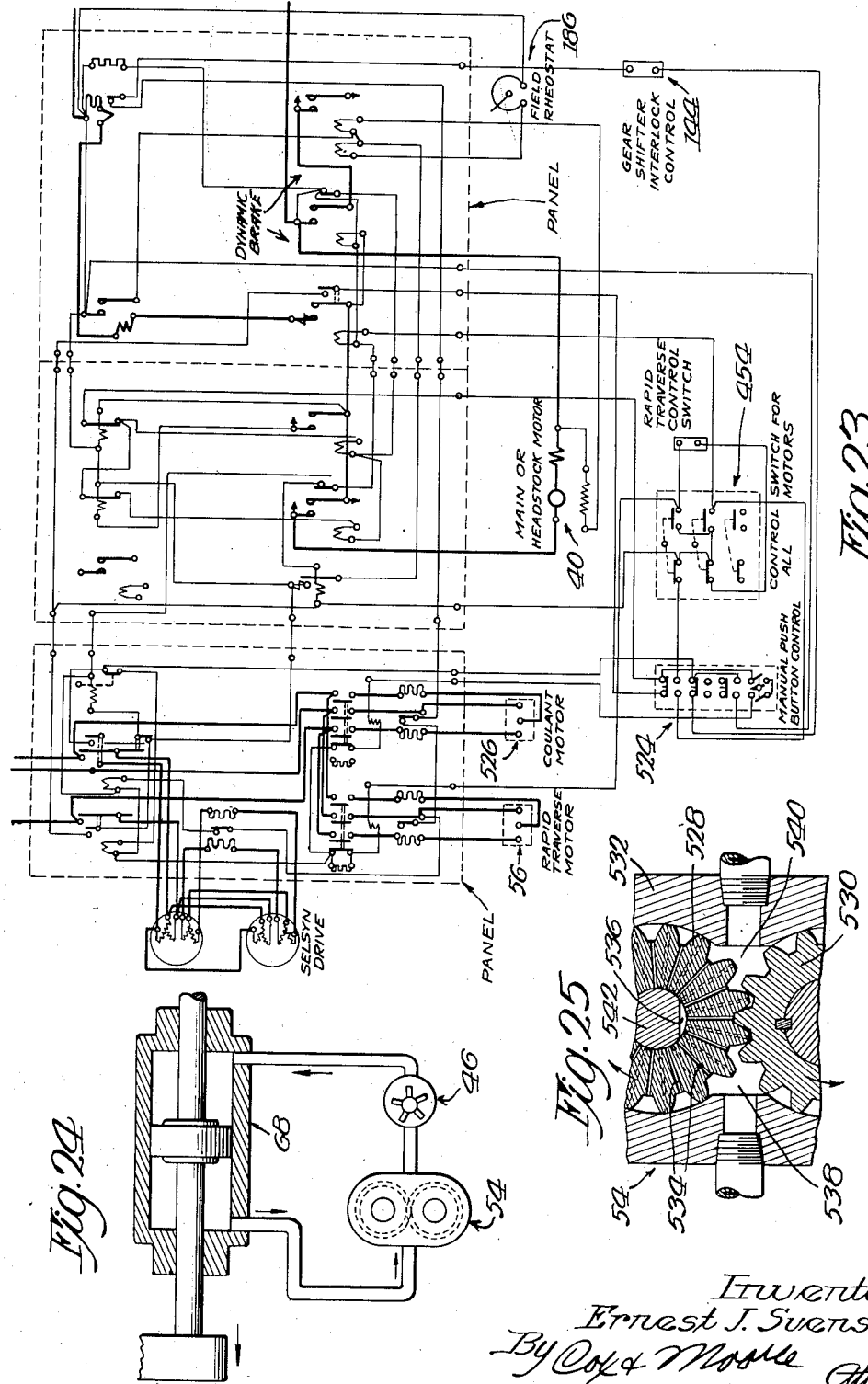

Patented Dec. 20, 1938

2,140,565

UNITED STATES PATENT OFFICE 2,140,565

MATERIAL WORKING APPARATUS

Ernest J. Svenson, Rockford, Ill.

Application January 23, 1934, Serial No. 707,934

125 Claims. (Cl. 82—2)

This invention relates generally to material working apparatus, and more particularly to machine tools and to hydraulic and electrical controls therefor. It is well established that advancements made in various arts—for example, the art of machine tools and the like—frequently result from the fact that the work to be performed in the production of a new article or device of manufacture is incapable of being satisfactorily accomplished by conventional machines. In other words, necessity is often the forerunner of invention. However, unless the mechanism constructed in accordance with the idea of meeting the need therefor, proves satisfactory from the standpoint of practical application in the field, the public receives little or no benefit.

This is particularly true in the art of machine tool design wherein machines are constantly being developed for the purpose of performing operations necessitated by the inherent nature of the work piece, and hence the work to be performed thereon.

The development of new high speed cutting tools, such as tools comprised of tungsten carbide and other alloys, has enabled cutting operations to be performed at much greater speeds than were formerly possible. Obviously this increase in cutting speed, coupled with the ability to make heavier cuts by such tools, requires the development of machines which will withstand the tremendous strains and stresses incident to these cutting operations. It is fair to say that the application of these high speed tungsten carbide tools over a broader range of use in the field is dependent upon the ability of machine tool builders to provide machines which will successfully withstand the forces set up when these tools are employed. That is to say, such machines, under the above mentioned heavy duty conditions, must not become distorted as a result of the action of unbalanced forces and the like. In other words, an accurate machining operation must take place, even though the tool is cutting at a much higher rate of speed and is making a much heavier cut in the work. It is, therefore, one of the important objects of the present invention to provide a machine tool which is particularly adapted to withstand severe or heavy duty operating conditions, and to enable the rapid and accurate machining of a work piece while operating under such conditions.

Heretofore high speed operation—for example, the high speed rotation of a work supporting spindle in a lathe—has been held within a predetermined range because of certain structural limitations in the machine proper, and it is one of the important objects of the present invention to provide a machine wherein spindle rotation may be increased far above the speeds attained in conventional machines without subjecting the work to the hazards of inaccuracy or other imperfections resulting from vibrations and the like. To this end I propose to provide a machine wherein a heavy duty spindle may, in fact, be rotated at speeds ranging from approximately 50 R. P. M. to 4,000 R. P. M., and to equip the machine with control mechanism whereby this range of operation may be accomplished with safety without introducing deleterious vibrations, etc.

Another problem with which machine tool builders have been confronted for many years is that of directly coupling a prime mover—such as an electric motor—in line with a spindle; for example, the spindle of a lathe. My invention contemplates a machine whereby this direct coupling is accomplished, and wherein the speed of a spindle and the feed of the machine may vary over a range heretofore considered as being impossible, at least from a practical viewpoint.

More specifically, it is an object of my invention to provide a machine as above set forth wherein the mechanism for imparting feeding movement to a tool carriage or the like is synchronized with the prime mover which propels the spindle over the above mentioned wide range of speeds, and to this end I provide an improved practical control arrangement whereby the wide range of spindle speeds in synchronism with the range of carriage feed will take place without the introduction of shocks, vibration, and the like.

Still more specifically, the invention contemplates the synchronizing of a propelling mechanism—such as a feed pump—with the prime mover coupled with the spindle without the use of mechanical couplings, and to this end I propose to employ elements of a driving arrangement which is commonly referred to by engineers as the Selsyn drive. I contemplate the use of the prime mover or motor which drives the spindle for propelling a generator, and this generator is electrically coupled with a motor, which provides a prime mover for a propelling mechanism, such as a feed pump. In this manner the propelling mechanism or feed pump which serves to propel a machine carriage is synchronized with the spindle, and said spindle may vary in speed over a very wide range without in any way subjecting the pump to severe strains and stresses.

It is another object of my present invention to provide in a machine of the type set forth above an improved mounting for the spindle, which mounting is designed to withstand the severe forces set up when the spindle is operating at high speeds. The mounting of the spindle contributes materially in providing a rigid support for heavy work pieces rotating at high speeds, and thereby enables cutting tools—such as tungsten carbide, diamonds, and the like—to accurately machine the work and positively preclude distortions which might otherwise result.

More specifically, the invention contemplates a spindle support wherein an anti-friction bearing of special design is provided at the work supporting end of the spindle to take up radial loads, and a special anti-friction bearing is provided at the driven end to take up both radial load and end thrust, said parts being specially designed to operate under high speed conditions without overheating.

A further object of the invention is to provide a machine as set forth above, wherein the electric motor or prime mover directly coupled with the spindle may operate over a relatively wide range of speeds—for example, between 450 and 4,000 R. P. M.—and in combination therewith I provide reduction gearing whereby a spindle speed ranging between 57 and 450 R. P. M. is obtained, the variation in speed resulting from the electrical control of the motor.

A still further object of the invention is to provide an improved driving arrangement as set forth above wherein a driving motor is provided, which is capable of a very fine speed variation and which is free from clutches and conventional braking devices, the dynamic braking of the motor serving to replace a conventional brake.

A very important object of the invention is to provide a machine capable of producing the work set forth above, which is free from vibration, and to this end I propose to preload the bearings of the machine spindle and have a balanced driving connection between the prime mover and the spindle.

In addition to the above mentioned and numerous other objects and advantages, the invention contemplates an improved control arrangement affording complete control of a machine carriage with respect to speed, such as feeding and rapid traverse, and also controlling the starting and stopping of said carriage in timed relation with the rotation of the spindle, and to this end I propose to provide a single control member, which may be manipulated to control all or some of the electrical prime movers, and also to control the feeding and rapid traverse movement of the carriage in a very simple and effective manner.

More specifically, the invention contemplates control mechanism wherein the propelling devices for imparting rapid traverse and feeding movement to the machine carriage may be controlled so that rapid traverse movement in opposite directions takes place independently of fluid supplied by a feed pump, or said rapid traverse may cooperate with the feeding fluid in propelling the machine carriage.

Another object is to provide an improved hydraulic control for a machine of the type set forth above wherein a simple and single control device is employed for selectively controlling the operative functioning of the feed pump and a rapid traverse pump in such a manner that fluid from the feed pump may be circulated so as to render the same inoperative or the prime mover therefor may be stopped during the functioning of the rapid traverse pump.

The foregoing and numerous other objects and advantages will be more apparent from the following detailed description when considered in connection with the accompanying drawings, wherein—

Figure 1 is a front elevational view of a machine which is representative of one embodiment of my invention;

Figure 2 is a fragmentary detail view of the hydraulic actuator for moving the tool supporting carriage;

Figure 3 is a fragmentary rear elevational view of the left end of the machine as viewed in Figure 1 to more clearly illustrate the location of the hydraulic unit with respect to the adjacent headstock structures;

Figure 4 is a diagrammatic illustration to more clearly show the manner in which the feed pump is synchronized with the main or headstock motor;

Figure 5 is a transverse horizontal sectional view of the headstock, particularly the spindle support, said view being taken substantially along the line 5—5 of Figure 1;

Figure 6 is a fragmentary sectional view of the left end of the machine, said view being taken substantially along the line 6—6 of Figure 1, this view being shown to more clearly illustrate the manner in which the electrical panels are conveniently housed beneath the main motor;

Figure 7 is a transverse sectional view of the headstock taken substantially along the line 7—7 of Figure 5;

Figure 7A is a detail plan view of the electrical interlock control shown in Figure 7;

Figure 8 is a transverse sectional view of the machine taken substantially along the line 8—8 of Figure 1;

Figure 9 is a fragmentary vertical transverse sectional view of the tool carriage taken substantially along the line 9—9 of Figure 8;

Figure 10 is a fragmentary sectional view taken substantially along the line 10—10 of Figure 9;

Figure 11 is a fragmentary plan view of the tailstock extremity of the machine, together with the tool carriage, said view being shown to more clearly illustrate the functional and structural characteristics of the mechanism employed for cutting tapers and the like;

Figure 12 is an enlarged horizontal fragmentary sectional view of the tailstock spindle, said view being taken substantially along the line 12—12 of Figure 1;

Figure 13 is a fragmentary transverse sectional view taken along the line 13—13 of Figure 12 to more clearly illustrate the manner in which lubricant is supplied to the tailstock;

Figure 14 is a perspective layout of the control bars adapted to be shifted by manipulating handles provided at the front side of the machine, said view being semi-diagrammatic in nature;

Figure 14A is a detail disclosure of the bar compensating mechanism mounted on the front side of the machine bed immediately beneath the tailstock;

Figure 15 is an enlarged fragmentary vertical sectional view taken substantially along the line 15—15 of Figure 1 to more clearly illustrate the interlocking control mechanism for the rapid traverse and feeding pumps;

Figure 16 is a sectional view taken substantially along the line 16—16 of Figure 15, illustrating the vertically slidable plate which cooperates to insure the neutral positioning of the main control valve when the main motor is activated;

Figure 17 is an enlarged rear elevational view of the hydraulic unit to disclose the manner in which the feed pump, main control valve, and Selsyn motor are mounted thereon;

Figure 18 is a view taken from the left of Figure 17 with a portion of the hydraulic unit housing broken away to more clearly illustrate the position of the oil reservoir and the driving connection between the Selsyn motor and the feed pump;

Figure 19 is a semi-diagrammatic illustration of the hydraulic system, which serves to maintain the spindle and back gear properly lubricated;

Figure 20 is a circuit diagram to illustrate the manner in which the hydraulic actuator for the carriage and the hydraulic actuators for the cross slide mounted thereon are controlled;

Figure 21 is a fragmentary transverse sectional view of the main control valve taken substantially along the line 21—21 of Figure 20;

Figure 22 is a similar transverse sectional view taken substantially along the line 22—22 of Figure 20;

Figures 23 and 23A are electrical circuit diagrams illustrating the manner in which the various switches and motors are electrically coupled;

Figure 24 is a diagrammatic illustration of a modified hydraulic circuit arrangement; and Figure 25 is an enlarged fragmentary cross-sectional view of the gear pump shown in Figure 24 to more clearly illustrate the structural details thereof.

Figure 23A:
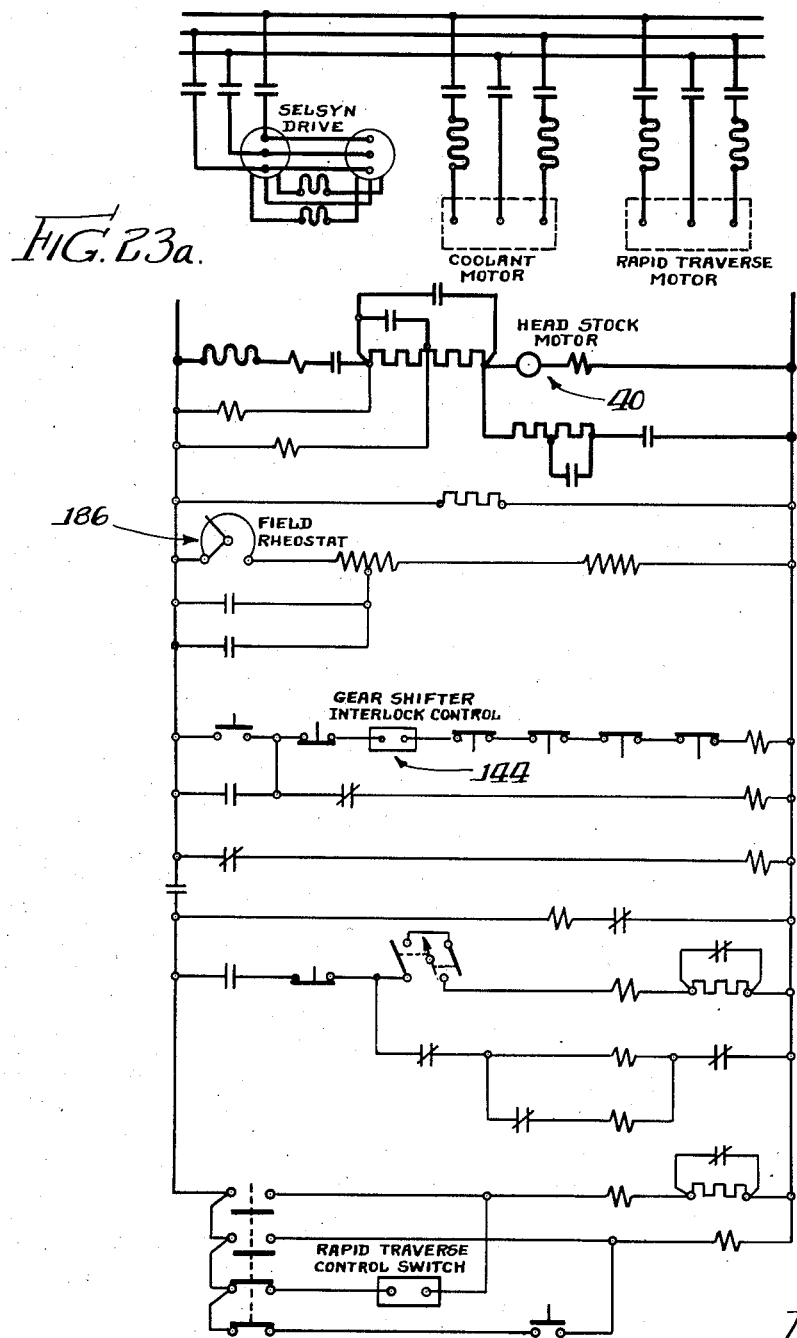

Referring now to the drawings more in detail wherein like numerals have been employed to designate similar parts throughout the various views, I shall first describe generally certain main structures of a machine which is representative of one embodiment of my invention. The machine includes a suitable bed 30, one end of which supports a headstock 32 and the other end a tailstock 34. The headstock 32 includes a spindle supporting structure 36 in which a work supporting spindle 38 is rotatably mounted. The spindle 38 is driven from a main or headstock motor 40, and I have found it preferable to use a D. C. motor capable of developing at least 50 H. P., and which is further adapted to be varied in rotative speeds over a relatively wide range, for example, from 450 R. P. M. to approximately 4,000 R. P. M. The motor 40 drives an A. C. generator 42 which will hereinafter be referred to as the Selsyn generator.

A hydraulic unit designated generally by the numeral 44 (Figures 3, 17, and 18) is mounted at the rear of the bed and adjacent the spindle support. This hydraulic unit includes a feed pump 46 which is driven from a motor 48, which motor is electrically connected with the Selsyn generator 42 and will be hereinafter referred to as the Selsyn motor. A casing 50 provides a housing for a suitable fluid reservoir 52 which serves as a source of supply for a rapid traverse pump 54 which is driven from a prime mover or electric motor 56, (Figure 3).

Suitable electrical controls hereinafter to be described in detail, are arranged compactly in the vicinity of and beneath the main motor 40. The positioning of these controls in this compact and inconspicuous manner contributes toward the efficient functioning of the device as a machine tool. Slidable on suitable ways 58 provided along the upper intermediate portion of the bed 30 is a tool carriage 60, which includes a bracket structure 62 for supporting various controls and a cross slide 64, which is adapted independently to shift transversely and with the carriage 60 longitudinally of a work piece supported between the spindle 38 and the tailstock 34. Secured to the underside of the carriage 60 is a cylinder 66 which forms an element of a hydraulic actuator 68, later to be described, and serves to impart movement to the carriage longitudinally of a supported work piece.

With the foregoing structures in mind, it should be understood that rotation at a selected speed is imparted to the spindle 38 by means of the main motor 40, and that the feed pump 46 is driven in synchronism with the spindle through the agency of the above mentioned Selsyn drive, which includes the generator 42 and the motor 48. The feed pump 46 is hydraulically coupled with the actuator 68 and thus enables the carriage 64 to be propelled at a feeding rate which is in synchronism with the spindle rotation. The rapid traverse pump 54 also operates at selected intervals to impart rapid traverse to the carriage 64. I shall now describe more in detail the various mechanisms of the machine tool or lathe.

*Spindle support*

The spindle support or structure 36 is best shown in Figures 1, 5, and 7. The spindle 38 is mounted within preloaded anti-friction bearings 70 and 72. These bearings are, in turn, mounted within a casing or frame 74, which frame is secured and positioned upon the bed 30 by suitable means 76. The bearing 70 is particularly designed to take up radial loads, whereas the bearing 72 in which the balls are encased in deeper raceways, is designed to take up thrust, as well as radial loads. Suitable collars or the like are employed to secure the ball races in position, as clearly shown in Figure 5. Attention is also directed to the fact that the portion of the spindle 38 extending beyond the end of the bearing 70 is provided with a lubricant seal 78 to prevent the leakage of lubricant from within the casing 74. Rotation is imparted to the spindle 38 from the drive shaft 80 of the main motor 40, which shaft, through the agency of a balanced coupling 82, connects with a stub shaft 84. This stub shaft 84 is mounted within an anti-friction bearing 86 and carries a gear 88, which is keyed thereto. This gear 88 is provided with teeth 90 adapted to mesh with internal companion teeth 92 of a shiftable clutch collar 94 (Figure 5). The clutch member 94 is adapted to be shifted manually to the left through the agency of a yoke 96, which is manually controlled by means of a lever 98 mounted on the top of the casing 74 at the front side thereof (Figures 1 and 7). Suitable detents or members 100 yieldingly urged into association with the teeth 92 serve to maintain said teeth in proper position of registration, said detents being shiftable within an aperture provided in a collar 102 carried by the spindle 38. An anti-friction bearing 104 is carried upon the reduced extremity of the stub shaft 84 and forms a bearing for one end of the supporting collar 102. When the clutch collar 94 is shifted to the left into mesh with the teeth 90, a direct coupling or drive is established between the motor 40 and the spindle 38. However, this coupling cannot be established until a stop 106 carried by a back gear structure 108 has been shifted rearwardly out of the path of the movement of the clutch member 94.

The preloading and positioning of the bearing 70 and 72 is such that at the end of the spindle 38 adjacent the work only radial thrust is experienced by the bearing 70, and this precludes the possibility of overheating the bearings. In other words, if these bearings were subjected to end thrust, as well as radial thrust, there would be a potential hazard of overheating. The danger of overheating is also decreased by reducing the area contact due to preloading of the bearing 70, as compared with the area contact due to preloading of the bearing 72. The bearing 72, being located at a point removed from the end of the spindle which supports the work, is not subjected to radial loads which are as severe as the radial loads experienced by the bearing 70, and hence are adapted to take up thrust loads as well. The importance of these structural details will be more apparent when it is understood that the spindle 38 is subjected to speeds ranging from approximately 50 to 4,000 R. P. M., and further, that a 50 H. P. motor is constantly applying a load to the spindle.

The back gear structure 108 includes a frame 110 which is pivotally supported upon a member 112 (Figure 7) extending upwardly from the bottom of the frame 36. Mounted within the frame 110 upon preloaded anti-friction bearings 114 and 116 is a back gear shaft 118. A gear 120 mounted upon the shaft 118 is adapted to mesh with the drive gear 88 when the frame 110 is shifted toward the spindle and occupies the position shown in Figures 5 and 7. In this position the gear 88 drives through the gear 120, and a smaller gear 122 mounted on the shaft 118 drives a main drive gear 124 carried by the spindle 38. In this manner the spindle may be driven at a speed which is lower than the speed obtained from the direct drive of the motor 40 thereto.

In this connection particular attention is directed to the fact that the main or larger drive gears 120 and 124 are preloaded so as to take up any distortion which might otherwise result from the tremendous speeds at which these gears are normally driven. It will be noted that the gear member 120 is of an annular type which is mounted on a flange section 126 of the drive shaft 118. In placing the gear member 120 on this flange, it is preloaded to such an extent as to take up any expansion which might otherwise result from centrifugal forces acting upon the gear. The gear 124 is likewise of annular form and is supported upon a pair of rotary members 128. These members 128 are secured to an internal flange 130 of the gear 124 by means of bolts 132. Clearance is present between the members 128 before clamping rings 134 are tightened against said members. The tightening of these rings springs the members 128 together at the hub, and sets up sufficient spring tension against the inner periphery of the gear 124 so as to take up any expansion of the gear resulting from centrifugal forces. These are important structural details because they contribute toward the efficient, accurate functioning of the machine. It will be seen that the gear supporting members 128 are suitably keyed directly upon the spindle 38.

Swinging movement of the frame 110 is accomplished through the manual manipulation of a control handle 136. When this control handle occupies the position shown in Figure 7 and a solid line position shown in Figure 7A, an eccentric member 138 coupled with the handle occupies a position within a companion bearing 140 in the frame 110 so as to urge the frame 110 into engagement with an adjustable screw or abutment 142. When the handle 136 is shifted to the dotted position shown in Figure 7A, the gears 120 and 122 are moved out of mesh with their companion gears 88 and 124, respectively. As previously pointed out, the stop 106 moves rearwardly with the frame 110, thereby enabling the clutch collar 94 to be shifted to the left (Figure 5). An electrical interlock, which will be more readily understood from an examination of the circuit diagram shown in Figure 23, is employed to prevent the functioning of the main motor 40 during the shifting of the back gears 120 and 122. It will be noted that the pivoted extremity of the handle 136 is provided with a cam section 144. When the handle 136 occupies the solid line position shown in Figure 7A, a member 146 of a switch 146a is yieldably maintained in the position shown. In this position the free extremity of the member 146 rests within the low or recessed portion of the cam 144. In this position the switch is closed. However, as the handle 136 is shifted to the left, the high surface of the cam 144 raises the member 146 and thus opens the switch 146a, and in this manner opens the circuit connected with the motor 40, thereby preventing the starting of the motor until the handle has been shifted to the dotted position. In other words, the switch 146 cooperates with the handle 136 to provide an electrical interlock between the back gear and the spindle. It will be noted that the handle 136 is provided with a shiftable end section 148 which must be pulled outwardly against a spring 150 to disengage a detent 152 in order to enable the handle to be shifted about the axis of the shaft 154 which carries the eccentric member 138.

Before proceeding with the description of other portions of the machine, attention is directed to the fact that when the motor 40 is coupled directly with the spindle 38, a balanced driving connection is established. In other words, there are no centrifugal forces tending to laterally displace the rotating parts other than the normal centrifugal forces acting when balanced rotary parts are in motion. This balanced rotation is of the utmost importance in connection with high speed machines or lathes of the type disclosed herein.

*Lubricating system for headstock and gearing*

Attention is directed to Figure 19 wherein I have shown in a somewhat diagrammatic way the manner in which the rotating parts of the headstock are continuously lubricated. A suitable pump 156 is driven from the motor shaft 80 through a flexible drive 158 and a speed reducing mechanism 160. The pump 156 is illustrated diagrammatically because the invention is not in any sense limited to any specific pumping device. It will suffice to say that the pump 156 receives lubricant from a reservoir 162 and distributes said lubricant through conduits or pipe lines 164, 166, 168, and 170. The conduit 164 supplies fluid to the bearing 86, and the conduit 166 supplies fluid to the gearing or clutch member 94, the bearing 104 and parts associated therewith. The conduit 168 supplies lubricant to the bearing 72, while the conduit 170 supplies lubricant to the bearing 70. In this manner the bearings of the spindle are constantly lubricated during the rotation thereof and the possibility of overheating is reduced to a minimum.

A separate lubricating system is employed for the back gear structure inasmuch as this structure is employed only occasionally. This separate lubricating system includes a suitable pump such as a gear pump 172, which may be driven from the back gear drive shaft 118. This pump 172 receives lubricant from a reservoir 174. The fluid from the reservoir 174 passes through a conduit 176 and thence through a filter 178 into the pump 172. From the pump 172 lubricant is delivered to the bearings 116 and 114, and is also directed to the meshing zone of the drive gears, as clearly indicated in Figure 19. The pump 172 also delivers lubricant to the clutch member 94. It will also be understood that the spindle or headstock casting or casing 74 serves as a fluid sump or reservoir, and that the fluid passes through the filter or purilator 178. It will also be understood that the lubricating supplying mechanism is such as to allow a measured amount of lubricant per revolution of the spindle inasmuch as the lubricating pump is in synchronism with the spindle. By employing my structure, the possibility of causing the churning of lubricant within the casing 74, thereby developing excessive heat, is positively precluded.

Machine carriage

The machine carriage 64, as previously stated, includes a control supporting bracket 62 and a tool carriage or cross slide (proper) 64. The bracket 62 carries four control elements, namely, a control handle 180 which serves as a single control for the direction and speed of travel, and the starting and stopping of the machine parts, as will hereinafter be more fully set forth. A second control handle 182 serves as a manual control for starting and stopping all of the electric motors. A hand-wheel 184 serves to control a rheostat designated generally by the numeral 186, and thereby governs the speed of rotation of the main motor 40. A hand-wheel 188 serves to control the displacement of the feed pump 46. The functioning of these elements will be more clearly understood when the cycle of operation of the machine is set forth in detail. To more clearly understand the disposition and functioning of these control elements, reference is made to the perspective showing in Figure 14.

The cross slide 64 is more clearly shown in Figures 8 to 10, inclusive. This cross slide includes a carriage or slide proper 190, which is slidable upon a carriage member 192, which member is mounted upon the guideways 58. The slide 190 carries a tool 194 which is clamped in position by means of screws 196. The alinement of the carriage member 192 with respect to the ways 58 may be adjusted by means of a clamping bolt 198 (Figure 8), which carries a clamp 200 at the lower end thereof, said clamp cooperating with the underside of the rear guideway 58 to take up wear and maintain proper alinement. The hydraulic actuator cylinder 66 is supported by the carriage 192 and cooperates with a stationary piston 202 in effecting movement of the tool 194 longitudinally of a supported work piece.

Manual transverse movement of the cross slide 190 is accomplished through the agency of a hand-wheel 204, which hand-wheel is connected with a screw 206. The screw 206 is coupled with a pair of screw members or nuts 208 and 210 (Figure 8). The degree of transverse movement of the cross-slide 190 is limited by a stop member 212 (Figure 9), which is adapted to extend within a recess provided within a member 214. A screw 216 when tightened against a plug 218 is adapted to positively lock the cross-slide against transverse movement.

Attention is directed to the fact that the transverse movement of the cross-slide 190 is effected through the agency of a pair of actuator pistons 220 disposed on opposite sides of the screw 206. These pistons 220, through the agency of piston rods 222, are connected with a cross bar 224.

In this connection it will be noted that the transverse movement of the cross slide 190 may be controlled through the agency of a roller 226, which is adapted to bear against a cam member 228. This can be best understood by referring to the plan view in Figure 11, wherein the cam member or bar 228 is shown more in detail. The cam member 228 (as shown in Figure 11) is provided with step portions, and these step portions conform with the nature of the work piece upon which the tool 194 acts. In some instances a tapered cam bar may be found necessary. However, for purposes of disclosure, one form of cam bar is shown in Figure 11. Through the agency of hydraulic actuator cylinders 220, the positive shifting of the cross slide in combination with the cam bar 228 is insured. Obviously in instances where merely cross feed is required, the cam bar 228 need not be employed.

Tailstock

The tailstock 34 is best shown in Figures 1 and 12. This includes a frame 230 which is mounted on the upper portion of the bed 30. The frame or casing 230 provides a support for a sleeve 232. This sleeve is adapted to be reciprocated within the casing 230 through the agency of a screw 234 and a nut 236 carried by the sleeve 232. Rotation of the screw is accomplished through the agency of a hand-wheel 238. A tail-stock center 240 is mounted within preloaded bearings 242 and 244. A suitable ball 246 within a nut 248 provides an end thrust bearing for the center 240.

Particular attention is directed to the lubricating mechanism for the tailstock. In view of the high speed rotation of the work piece, I find it necessary to employ an automatic oiling arrangement, and this is clearly disclosed in Figures 12 and 13. A lubricant reservoir 250 is mounted at the rear side of the casing 230, and lubricant therefrom is directed through various passages 252, 254, 256, and 258 to a spring actuated member 260. This member 260 is slightly inclined with respect to the outer surface 262 of the enlarged portion of the center 240, as clearly shown in Figure 13. This lubricant which is forced into the confines of the member 260 passes out through a restricted opening 264 in said member and is thus rubbed or wiped away by the surface 262. The angle of inclination of the member 260 with respect to the surface controls the amount of fluid dispatched to the bearings 242 and 244. In this manner the flow of lubricant to the bearings is controlled in a very effective and satisfactory manner.

The tailstock 34 being necessarily quite large and hence very heavy would be difficult to move by the mere exertion of manual force. Therefore, I provide a hook 266 (Figure 11), which is secured to the bottom portion of the casing or frame 230. A pin 268 mounted on the carriage member 192 is adapted to be received by the hook 266, thereby establishing a coupling between said carriage member and the tailstock. Thus the tailstock may be moved hydraulically in response to the hydraulic shifting of the tool carriage. A clamping mechanism 270 is provided to secure the tailstock casing or frame in a fixed position upon the machine bed, and this mechanism may be controlled by manual manipulation of a handle 272.

Hydraulic unit

I have previously referred in a general way to the hydraulic unit 44 mounted at the rear side of the bed 30 adjacent the spindle support 36. This unit 44 is so arranged as to be readily detachable for purposes of repair, replacement and installation. Said unit presents a compactly arranged group of elements such as the Selsyn motor 48, the feed pump 46, the rapid traverse pump 54, the rapid traverse motor 56, and the oil reservoir 52. It will be seen that the Selsyn motor 48 drives the feed pump 46 through a vertical drive shaft 274 (Figure 18), the lower end of which carries a gear 276 which meshes with a companion gear 278 on a shaft 280. A gear 282 on said shaft meshes with a gear 284, which, in turn, meshes with a gear 286. This gear 286 is coupled with the feed pump 46. I prefer to employ a feed pump of the type disclosed in my copending application, Serial No. 430,867, filed Feb. 24, 1930, which has since matured into Patent No. 1,989,117. In that application I have disclosed a plunger pump wherein fluid leakage from the high to the low pressure side of the system is precluded, and therefore the pump is particularly adapted to be used in a closed hydraulic circuit. In view of the fact that the present invention is not limited to any particular pump structure, except as such pump may enter into the general combination with other elements, I do not deem it necessary to disclose the structural details of the pump. It will suffice to say that this pump is of the plunger pump type and the displacement thereof is capable of being varied between predetermined limits by turning a member 288 (Figure 17). This member is connected with mechanism which varies the eccentricity of the driving device (not shown) within the pump, and thus varies the stroke of the pump pistons. In this way the displacement of the pump is controlled within predetermined limits. As previously pointed out, the hand-wheel 188 is coupled with the adjusting mechanism of the pump 46 for the purpose of varying the rate of feed of the carriage. This will presently be more clearly set forth in connection with the description of the operating cycle of the machine. In addition to supporting the parts I referred to, the hydraulic unit also supports a main control valve mechanism 290 later to be described.

Hydraulic system of control

Before taking up in detail the manner in which the movement of the machine parts may be manually as well as automatically controlled, I wish to call attention to the hydraulic circuit whereby the operative functioning of the feed pump 46 and the rapid traverse pump 54 with respect to the hydraulic actuator 68, is selectively controlled. The main control valve mechanism 290 just referred to includes a suitable valve casing 292, and this casing carries a reciprocable main valve member 294 and what I prefer to call a feed control valve member 296. It will be noted that the valve member 294 as shown in Figure 20 occupies its central or neutral position. When the valve member occupies this position, fluid from the rapid traverse pump 54 is directed through a conduit or line 298 into a valve port 300. From this point said fluid passes through a radial valve port 302 and thence through a longitudinal passage 304 into an end chamber 306. This end chamber 306 communicates through a return conduit or line 308 and a restricted orifice 310 with the reservoir 52. Thus fluid from the gear pump is circulated back to the reservoir against the pressure which is developed as a result of the restricted orifice 310. At this point it should also be understood that the pressure thus established is exerted with equal force at each extremity of the valve member 294, thereby maintaining said valve member in absolute balance.

If, under the circumstances set forth above, the feed pump 46 is being driven through the agency of the mechanism previously described, fluid will pass through the pump into a conduit or line 312 and thence into a starting and stopping valve mechanism designated generally by the numeral 314. This mechanism 314 includes a valve casing 316 and a valve member 318 reciprocable therein. When the valve member 318 is maintained through the agency of a spring 320 in the position shown in Figure 20, fluid from the line 312 is adapted to circulate through a peripheral valve port 322 back to the intake side of the feed pump 46 through a conduit or line 324. Thus the feed pump is functionally inoperative for propelling purposes. In this connection it will be observed that the left end of the casing 316 is coupled with the valve port 300 through a conduit 326, and that the pressure within the conduit is not sufficient to overcome the force of the spring 320.

Assume now that the valve member 294 is slightly shifted to the right. This causes a restriction in the radial port 302 and thus an increase in fluid pressure takes place within the side areas 328 of the valve member 294. This increase in fluid pressure is transmitted through the conduit 326 and thus acts to urge the valve member 318 to the right against the action of the spring 320. Also, the slight shifting of the valve member 294 to the right causes an aperture 330 to be brought into communication with fluid at higher pressure, and thus fluid pressure is transmitted through a passage 332 to a chamber 334 at the right end of the feed control valve member 296. This causes the valve member 296 to be retained in the left position as shown in Figure 20. Fluid forced from a chamber 336 at the left end of the valve member 296 is free to flow through a passage 338 and thence into the valve chamber 306. The slight shifting of the valve member 294 is not sufficient to affect the circulation of the fluid from the gear pump 54, but is sufficient to control the shifting of the feed control valve 296. Under the conditions just described, fluid under high pressure from the feed pump 46 is directed through the starting and stopping valve mechanism 314 into a conduit or line 340, a valve passage or port 342, a radial port 344 in the valve member 296, a longitudinal passage 346, a radial passage 348, and thence through a valve port 350 and a conduit 352 to the right end of a hollow piston rod 354 coupled with the piston 202. An aperture 356 permits fluid to enter the right chamber 358 in the cylinder 66, thereby causing the carriage 60 to move at a feeding rate to the right.

To obtain movement of the carriage at a feeding rate to the left and assuming that the valve member 294 occupies the neutral or starting position referred to above, it is only necessary to urge the valve member 294 slightly to the left. By so doing, the same restriction takes place within the radial valve port 302 so as to establish an increase in fluid pressure within the side areas 328, and thus cause the valve member 318 to be urged to the right. However, this slight shifting of the valve member 294 to the left causes fluid under increased pressure to communicate with a valve passage 360. Thus the increase in fluid pressure is transmitted through the passage 338 to the left end chamber 336, thereby causing the feed control valve 296 to be urged to the right against a stop 362. In this position fluid from the feed pump 46 is directed by a radial port 364 of the valve member 296 into a valve port 366 and thence into a conduit 368 communicating with the left end of the hollow connecting rod 354. Fluid passes through an aperture 370 into the left chamber 372 of the actuator cylinder 66, thereby causing the machine carriage to be urged at a feeding rate to the left.

Before explaining the manner in which rapid traverse and feeding movements are selectively controlled, attention is directed to a valve mechanism 374 (Figure 20) which serves to control the direction of fluid delivered to the cross-slide actuator pistons 220. It will be noted that fluid pressures experienced within the chambers 358 and 372 of the actuator cylinder 66 may be transmitted through conduits 376 and 378, which connect with ports 380 and 382, respectively, in a valve casing 384. A valve member 386 within the casing 384 is manually shiftable through the agency of a control handle 388, and when said valve member occupies the central or neutral position shown in Figure 20, no fluid pressure is transmitted to the actuator pistons 220. In other words, these pistons are locked in position. However, if the valve member 386 is shifted rearwardly and fluid pressure is established within the conduit 378, the actuator pistons will be moved forwardly. If, under such circumstances, the higher fluid pressure is present in the conduit 376, the pistons 220 will experience a rearward movement. Thus, depending upon the position of the valve member 386 and also upon the fluid pressure in the conduits 376 and 378, the direction of movement of the pistons 220 may be very conveniently controlled.

Assume now that instead of moving the valve member 294 slightly to the left as previously described, said member is moved completely to the left so as to bring the side areas 328 into communication with the valve port 366. Under such circumstances fluid from the gear pump 54 delivered to the side areas 328 is directed to the left end chamber 372 of the actuator cylinder 66, and fluid from the right end of said cylinder passes outwardly through the conduit 352 and thence into the valve port 350. Likewise, when the valve member 294 occupies its extreme right position, fluid from the rapid traverse pump 54 is delivered to the right end of the cylinder 66.

Thus far I have referred only to the manual control of the valve member 294, but it will be obvious that said control may be fully automatic, and this is accomplished through the agency of suitable dogs 390, 392, and 394 adjustably carried upon guide bars 396 mounted on the front side of the bed 30.

*Automatic control*

The automatic control of the hydraulic circuit just described may be more readily understood by referring to the perspective disclosure in Figure 14 in conjunction with the hydraulic circuit of Figure 20. The control handle 180 which is mounted on the front side of the control supporting bracket 62 (Figure 15) is rotatable with and mounted upon a sleeve 398. The handle is pivotally carried by a member 400, which is mounted directly upon the sleeve 398 and is keyed thereto. The inner extremity of the sleeve 398 supports a disk 402 having ears 403, which is positioned adjacent a bevel gear 404 formed integral with the sleeve 398. A pin 406 carries a disk 408 and this disk carries a pair of oppositely disposed registering pins 410 which are adapted to register with and engage within companion apertures provided in the disk 402. The pin 406 is normally urged to the left (Figure 15) through the action of a coil spring 412, thereby maintaining an interlock between the disk 402 and the gear 404. To disengage the connection between the sleeve 398 and the disk 402, it is only necessary to swing the handle 198 outwardly, namely, to the left (Figure 15), thereby urging the pin 406 inwardly and causing the pins 410 to be withdrawn from the complementary apertures in the disk 402. The driving connection of the sleeve 398 and the gear 404 with the handle is always maintained, and hence movement of the handle 180 about the axis of the sleeve 398 will positively effect the shifting of the main control valve member 294, regardless of the disengagement of the pins 410 from the disk 402.

The foregoing can be best understood by referring to Figure 14 wherein it is shown that rotation of the gear 404 causes rotation of a companion gear 414, which is slidably mounted upon a square rod 416. The left extremity of this rod 416 carries a segment 418 which meshes with a rack bar 420. This rack bar 420 also meshes with a second segment 422 connected with a rod 424. The rod 424 is coupled with an actuating finger or member 426, which makes a slotted connection or coupling with the left end of the valve member 294, as clearly shown in Figure 20. Thus movement of the control handle 180 to the left causes the valve member 294 to be shifted to the right (Figure 20), and likewise, movement of said handle to the right (Figure 14) causes said valve member to be shifted to the left (Figure 20). When the handle 180 occupies its vertical position as shown in Figure 1, the valve member 294 is in neutral. It will thus be apparent that the handle 180 serves as the manual control for the valve member 294. Automatic control of said valve member is governed by means of the dogs 390, 392, and 394 previously referred to, which dogs are adapted to engage a pin or finger 428 carried at the lower extremity of a vertically shiftable rack bar 430. The upper end of this bar meshes with a quadrant or gear segment 432 carried by the square rod 416. Thus it will be apparent that the shifting of the rack bar 430 and the consequent shifting of the main control valve 294 may be selectively and automatically controlled by the aforementioned dogs. Any automatic cycle of operation can be obtained by the use of proper dogs disposed along the supporting bars 396. It will also be noted that the roller 420 carries a rack bar 434 which is adapted to shift a lever 436 of a rapid traverse control switch 438. When the control handle 180 occupies its central or neutral position, the roller 434 engages the member 436 and thereby maintains the switch 438 open. In other words, under these conditions the rapid traverse motor 56 is disconnected from the circuit, and hence the rapid traverse pump 54 is inactive. However, when the handle 180 is moved so as to shift the main control valve 294 to either of its rapid traverse positions, the roller 434 moves away from the member 436, thereby enabling the switch 438 to automatically close.

The purpose for having the disk 402 provided with the ears 403 (Figure 16) is to cause said disk to be automatically shifted to the central or neutral position through the action of a vertical plate or bar 440. This plate 440 is provided with rack teeth 442 which mesh with a gear segment 444 carried by a square rod 446 (Figure 14). The left extremity of this rod 446 is connected through a bell-crank 448, a link 450, and a second bell-crank 452 with a switch mechanism 454, which is designed to control the disconnection and connection of the motors including the motor 40. Manual control of rotation of the rod 446 is accomplished by manipulation of the handle 182. This handle acts through a pair of bevel gears 456 and 458 to control the rotation of the rod 446. Thus, when the handle 182 occupies the vertical position shown in Figure 14, the switch mechanism 454 is opened so as to disconnect the motors from the line and the plate 440 occupies its uppermost position. In this position the ears 460 engage the companion ears 403 of the disk 402, thereby securing said disk against rotation.

The importance of this construction will be more readily appreciated when it is understood that, if the main control valve member 294 occupied a rapid traverse or feeding position when the switch mechanism 454 was closed, it might cause considerable damage. In other words, it is desirable to have a safety mechanism which will insure the positioning of the main control valve in neutral at the time the switch mechanism 454 is to be closed. Assume, for example, that an operator shifted the control handle 180 so as to effect a rapid traverse movement of the tool carriage and, before returning the handle to neutral, opened the switch 454 by the manual manipulation of the handle 182 so that he could leave the machine. Upon returning to the machine, it is quite possible that he would forget that the main control valve was left in rapid traverse or feed position and considerable damage might result if the motors were cut in. However, by employing the plate 440, the main control valve is always returned to neutral when the motors are cut out provided, of course, that the interlock between the disk 402 and the bevel gear 404 is maintained by the pins 410. Thus, if this interlock is maintained and the plate 440 moves upwardly, the engagement of the companion ears 403 and 460 causes the automatic positioning of the handle 180, and consequently the main control valve 294 in neutral. A vertical slot 462 co-operates with a pin or roller 464 in limiting and guiding the movement of the plate 440. The roller 464 is carried by a pin 466, as clearly shown in Figure 15.

From the foregoing description it will be apparent that if the control handle 180 is urged outwardly, namely, to the left (Figure 15 so as to disengage the pins 410 from the disk 402, the main control valve 294 may be shifted, even though the plate 440 remains in its uppermost position as shown in Figures 14 and 16.

It will also be noted that with the above described control mechanism the main motor 40, and consequently the Selsyn drive mechanism which propels the feed pump, may be electrically disconnected from the system without affecting the control of the rapid traverse switch 438. That is to say, if the control handle 180 is swung outwardly to disengage the pins 410, the rack bar 420 may be shifted so as to enable the shifting of the control valve 294, and also to control the functioning of the rapid traverse motor 56. In other words, rapid traverse movement of the carriage may take place while the main spindle driving and feed pump motors are inactive. As previously described, in connection with the hydraulic circuit shown in Figure 20, the main motor 40, as well as the Selsyn drive, may be electrically connected in the circuit during the functioning of the rapid traverse motor without causing the feed pump to operatively effect the hydraulic actuator 68. This is accomplished by the use of the starting and stopping valve mechanism 314 previously described wherein circulation of the feed pump 46 is accomplished. This affords at least two types of independent control of the rapid traverse and feeding fluids, and the invention also contemplates other mechanisms whereby the electrical control of the Selsyn motor may be accomplished in the same manner as the electrical control of the rapid traverse motor 56.

As previously pointed out, manipulation of the hand-wheel 188 serves to effect the control of the displacement of the feed pump 46, and this is accomplished through a pair of bevel gears 468 and 470, the latter slidably mounted upon a square shaft 472. This shaft 472 has a geared connection with a transversely extending shaft 474 which is connected with a valve adjusting rod or shaft 476 through the agency of gears 478—480 and a flexible drive 482. Thus manipulation of the hand-wheel 188 serves to vary the speed of the hydraulic actuator 68 by varying the displacement of the pump 46. As previously pointed out, the speed of the feed pump 46 is synchronized and varies with the speed of the main motor 40, and the displacement control simply affords additional adjustment in instances where such adjustment is required.

The hand-wheel 184 is connected with a square rod 484 which serves to operate the rotary rheostat mechanism 186, and by this adjustment the speed of the main motor 40 may be varied within predetermined limits. This affords a still further method of speed adjustment in addition to the fluid displacement control just described. The right extremity of the rods 416, 446, 472, and 484 are mounted within a support 486 (Figure 14A). Each bar is supported by an antifriction thrust bearing 488, and interposed between this bearing and a nut 490 is a coiled spring 492. An adjustable abutment screw 494 is also employed, as clearly shown in this figure. This supporting device 486 serves as a compensator to take care of any longitudinal shifting or changes in the rods.

The automatic and sudden reversal of the main control valve member 294 is accomplished by a reverse control valve member 496 (Figure 20). This valve member is normally held in the position shown in Figure 20 by means of a coil spring 498 which is housed within a cap member 500. In this position the valve member 496 prevents the flow of fluid from an end chamber 502 through a passage 504. However, when the fluid pressure within an end chamber 506 resulting when the actuator reaches the limit of its advancing movement, is sufficient to shift the valve member 496 against the action of the spring 498, communication between a return conduit 508 and the passage 504 is established through a radial valve port 510, a longitudinal valve passage 512 and a radial valve port 514. This sudden release of fluid from the chamber 502 enables the normal pressure of the balancing fluid within the chamber 306 to suddenly urge the valve member 294 to the right, thereby causing a rapid reverse travel of the carriage 60.

Electrical controls

Attention is directed to the fact that the headstock section of the bed 30, as shown in Figure 6, provides a mounting for electrical panels designated generally by the numeral 516. These panels are shown diagrammatically in Figures 23 and 23A and are indicated in a general way in Figure 6. Heretofore electrical controls such as panels and the like when used with machine tools have been very cumbersome and have not been readily accessible for purposes of repair and replacement. It will be noted that resistors 518 are mounted to one side of the bed in a very convenient position and are not in the way of the operator. All of the panels, resistors, and the like mounted in the chamber 520 beneath the main motor, are thoroughly ventilated by the provision of ventilator covers 522. While these are structural details, such details cooperate to render the machine most practical in the field and materially contribute toward its usefulness. It will also be noted that complete manual control of the machine may be accomplished by a switch mechanism 524 equipped with a series of buttons (Figures 1 and 23). In some instances it may be desirable to electrically control the machine by manual manipulation of these buttons. In addition to the electric motors thus far described, I also provide an electric motor 526, which is mounted at the right end of the bed 30 (Figure 1), and this motor serves to drive a coolant pump. Fluid from this pump (not shown) is employed in connection with the tool 194 during the machining of a work piece. A detailed description of the type of pump driven by the motor 526 is not deemed essential for a clear understanding of the present invention.

In Figures 23 and 23A a complete circuit diagram is disclosed to supplement the description of the operation of the machine thus far given. It is not deemed necessary for a clear understanding of the present invention to enter into a detailed discussion of this circuit diagram, inasmuch as the individual control elements are conventional in design and are merely electrically coupled so as to bring about the cycle of operation and control previously set forth. In Figure 4 I have in a somewhat diagrammatic manner disclosed the electrical coupling between the main motor and the feed pump through the Selsyn drive, and have disclosed the feed pump operatively coupled with the hydraulic actuator. This illustration is presented to simplify an understanding of the synchronized drive between the rotation of the spindle and the translation of the tool carriage.

Attention is now directed to the disclosure of a modified feed circuit shown in Figure 24. In this circuit I have shown the rapid traverse pump 54 connected in series with the feed pump 46, both of said pumps being connected in a closed circuit with the actuator 68. This particular arrangement is such as to enable a very small displacement of fluid from the feed pump 46 at relatively high pressures. I have found that when a confined fluid body, such as a body of oil, is subjected to relatively high pressures—for example, a pressure of 900 pounds—said fluid experiences a molecular change or compression. In other words, the fluid is preloaded. The effect of this preloading of the fluid due to the high pressures introduces no appreciable error when fluid is being displaced at a normal rate from the feed pump. However, if the fluid displacement is very small, in order to obtain slow feeding movement of a carriage, the preloading or molecular change in the fluid is sufficient to cause an appreciable slippage to take place. In other words, if the stroke of the pistons in the feed pump is very small, the volume delivered by the piston is correspondingly small, and hence it may be that the change or compression experienced as a result of the high pressure would, under certain circumstances, give no actual fluid delivery at the discharge side of the pump.

To overcome the above mentioned difficulties, I propose to couple the pump 54 with the intake of the feed pump 46 so as to charge the feed pump at a relatively high pressure, say, for example, 900 pounds. Assume that it is necessary to obtain a 1,000 pound pressure at the discharge side of the feed pump to propel the actuator. Then there will exist a differential of only 100 pounds between the charging fluid and the fluid delivered by the feed pump. Obviously the effect of this differential of 100 pounds would be insufficient to introduce any appreciable error. This should be compared with a system wherein the fluid delivered to the feed pump is at a relatively low pressure, which must be built up say from 200 pounds to 900 pounds. Under such circumstances this increase in pressure might be sufficient to introduce appreciable errors when relatively small displacement of the feed pump is desired. In fact, by employing the arrangement shown in Figure 24, a movement of the carriage at the rate of $\frac{1}{16}$ or $\frac{1}{32}$ of an inch per minute may be obtained. In this connection I call attention to the fact that the pump 54 may be of the type shown in my Patent No. 1,912,737, wherein a pair of gears 528 and 530 rotate within a casing 532. Fluid from the meshing teeth is directed through radial passages 534 into a valve port 536. Assume that the gears are rotating in the direction indicated by the arrows and that fluid is introduced within the chamber 538 and is discharged through the chamber 540. The pressure within the chamber 540 may be maintained at a predetermined point, and fluid may bypass back through the radial passage 534, the valve port 536 to the intake chamber 538. The adjustment of the valve member 542 will serve to vary the degree of bypassing and hence the amount of pressure developed within the discharge chamber 540.

Referring to Figure 20, it will be observed that I provide bleed passages 544 and 546 in the valve member 294 in order to take care of any slight leakage which may occur in the packings of the hydraulic actuator 68 and other associated parts. However, these bleed passages are not employed for the purpose of counteracting leakage in the feed pump 46 inasmuch as I prefer to employ a pump wherein no slippage or leakage of any appreciable amount occurs. Each of these bleed passages opens into a longitudinal passage 548, which is best shown in Figure 22. A longitudinal passage 550 (Figure 22) maintains communication between the chambers at the opposite extremities of the valve member 294.

By having the fluid motor or actuator cylinder 66 formed integral with the carriage 192, a very rigid structure is presented, which is adapted to sustain the severe loads to which the machine is subjected. Attention is also directed to a steady rest 552 (Figure 1), which is adapted to be adjustably mounted upon the ways 58 of the bed. This device serves as an additional support for a work piece mounted between the headstock and tailstock. By providing a pair of nuts 208 and 210 for the screw 206 (Figure 8), wear in the screw can be readily taken up. I also provide a follow rest 553 which is mounted upon and moves as a unit with the carrier 60.

It will also be noted that in my machine the fluid reservoir is placed sufficiently high above the gear pump to positively preclude the introduction of air. In fact, the reservoir 52 comprises two chambers, namely, chamber 52a and chamber 52b. The fluid from the chamber 52a overflows into the chamber 52b so as to insure the calm delivery of fluid to the chamber 52b, and thereby prevent the introduction of air bubbles. As previously pointed out, the control valve 374 for the cross slide carriage is such that pressure may be directed to either side of the pistons 220 irrespective of the direction in which the fluid pressure is moving the actuator cylinder 66.

I prefer to construct the gears employed for driving the spindle 38 of Nitraloy. These gears are preferably of the herringbone type.

I also wish to call attention to the fact that the main motor 40 is equipped with electrical controls, as indicated in the diagram of Figure 23, which cause the dynamic braking of the motor and thereby effect the sudden stopping of the motor. This precludes the necessity of employing conventional brakes which are not adaptable when high speed conditions, such as those experienced by the machine of the present invention, are encountered.

While I have disclosed certain specific embodiments herein, it should be understood that the invention is not limited thereto, but is capable of numerous other modifications and changes without departing from the spirit and scope of the appended claims.

The apparatus herein described is capable of performing various cycles of operation. In fact, the invention as disclosed is not limited to any specific cycle of operation. In order to clearly understand the various cycles which may be followed, reference is made to the previous description, beginning with line 54, page 7 and continuing through to the end of line 7 on page 9.

Attention is directed to my earlier filed application Serial No. 684,677, filed August 11, 1933, wherein claims generic to the present invention are presented.

Having thus described my invention, what I claim as new and desire to secure by Letters Patent is:

1. In material working apparatus, a bearing structure, a supporting spindle rotatable within said bearing structure, a machine element, said spindle and machine element being relatively translatable, an electric motor for driving said spindle, propelling mechanism for imparting relative translation between said machine element and spindle, and electrical transmission interposed between said motor and said propelling mechanism for synchronizing the rotative speed of the spindle and the translating effectiveness of said propelling mechanism.

2. In material working apparatus, a bearing structure, a supporting spindle rotatable within said bearing structure, a machine frame, a translatable machine element supported by said frame, an electric motor for driving said spindle, propelling mechanism for imparting translation to said machine element, and electrical transmission interposed between said motor and said propelling mechanism for synchronizing the rotative speed of the spindle and the translative effectiveness of said propelling mechanism.

3. In a machine tool such as a lathe, a bed, a tool carriage translatable upon said bed, a bearing structure, a supporting spindle rotatable within said bearing structure, an electric motor for driving said spindle, actuator means for translating said carriage, propelling mechanism for said actuator means, and electrical transmission interposed between said motor and said actuator propelling mechanism for synchronizing the rotative speed of the spindle and the speed of translation of said actuator means.

4. In material working apparatus, a bearing structure, a supporting spindle rotatable within said bearing structure, a machine element, said spindle and machine element being relatively translatable, a frame for supporting said machine element, hydraulic actuator means for imparting relative translation between said machine element and said spindle, an electric motor for driving said spindle, pump means for propelling said hydraulic actuator, an electric motor for driving said pump means, and electrical transmission interposed between the spindle driving motor and the pump driving motor for synchronizing the rotative speed of the spindle and the propelling effectiveness of said pump means.

5. In material working apparatus, a bearing structure, a supporting spindle rotatable within said bearing structure, a machine element, said spindle and machine element being relatively translatable, an electric motor for driving said spindle, actuator means for imparting relative translation between the spindle and machine element, an electric motor for controlling the operation of said actuator means, an electric generator driven in synchronism with said spindle driving motor, and electrical transmission connecting said generator with the motor which controls the actuator means whereby to synchronize the rotative speed of the spindle and the speed of translation of said actuator means.

6. In material working apparatus, a bearing structure, a supporting spindle rotatable within said bearing structure, a machine element, said spindle and machine element being relatively translatable, an electric motor for driving said spindle, propelling mechanism for imparting relative translation between said machine element and spindle, electrical transmission interposed between said motor and said propelling mechanism for synchronizing the rotative speed of the spindle and the translating effectiveness of said propelling mechanism, and mechanism for effecting a preselected cycle of operation of said spindle and machine element.

7. In material working apparatus, a bearing structure, a supporting spindle rotatable within said bearing structure, a machine element, said spindle and machine element being relatively translatable, an electric motor for driving said spindle and adapted for direct coupling with said spindle, propelling mechanism for imparting relative translation between said machine element and spindle, and electrical transmission interposed between said motor and said propelling mechanism for synchronizing the rotative speed of the spindle and the translating effectiveness of said propelling mechanism.

8. In material working apparatus, a bearing structure, a supporting spindle rotatable within said bearing structure, a machine element, said spindle and machine element being relatively translatable, an electric motor for driving said spindle and adapted for direct coupling with said spindle and to rotate said spindle at a speed of at least 3,000 revolutions per minute, propelling mechanism for imparting relative translation between said machine element and spindle, and electrical transmission interposed between said motor and said propelling mechanism for synchronizing the rotative speed of the spindle and the translating effectiveness of said propelling mechanism.

9. In a machine tool such as a lathe, a bearing structure, a supporting spindle rotatable within said bearing structure, an electrical prime mover for rotating said spindle, a back gear construction associated with said spindle and prime mover, a support for enabling gears of said back gear structure to be shifted toward and away from said spindle, and means for preventing power delivery from said prime mover to said spindle during the shifting of said support.

10. In a machine tool such as a lathe, a bearing structure, a supporting spindle rotatable within said bearing structure, an electrical prime mover for rotating said spindle, a back gear construction associated with said spindle and prime mover, and a gear on the spindle cooperating with said back gears, at least one of said gears being preloaded to counteract the tendency for radial distortion resulting from centrifugal forces set up during the rotation thereof.

11. In a machine tool such as a lathe, a bearing structure, a supporting spindle rotatable within said bearing structure, an electrical prime mover for rotating said spindle, a back gear construction associated with said spindle and prime mover, a support for enabling gears of said back gear structure to be shifted, lubricating mechanism for said spindle, and lubricating mechanism for said back gear structure, said latter lubricating mechanism being operable only when said back gear construction is being operatively driven for rotating the spindle.

12. In a lathe, a bed, a bearing support, a spindle rotatable within said support, an electric motor adapted for direct coupling with said spindle, said motor being capable of developing approximately 50 horse power and being further capable of attaining a speed of at least 3,000 revolutions per minute, and electrical braking means for bringing said motor to a rapid stop including automatic control means to vary the effectiveness of said braking means.

13. In material working apparatus, a rotary supporting spindle adapted for variable speed rotation, a preloaded anti-friction bearing for carrying the supporting extremity of said spindle, said bearing being adapted for taking up radial load only, a second preloaded anti-friction bearing positioned at a point removed from the supporting end of the spindle and adapted to take up end thrust and radial loads experienced by said spindle, and an electric motor adapted for direct coupling with said spindle.

14. In a machine tool, a bed, a bearing structure, a spindle rotatable within said bearing structure, an electrical prime mover such as an electric motor for driving said spindle, said motor being supported in substantial alinement with said spindle, a machine carriage translatable upon said bed, actuator mechanism for imparting relative translation between the spindle and said carriage, a chamber in said bed located in the vicinity of said prime mover, electrical control means compactly arranged within said chamber, and control means manually operable for governing the functioning of said prime mover.

15. In material working apparatus, a bearing structure, a supporting spindle rotatable within said bearing structure, a machine element, an electric motor for driving said spindle, a hydraulic actuator for imparting relative translation between the machine element and spindle, a feed pump for imparting feeding movement to said actuator, pump driving means including electrical means for synchronizing the rotative speed of said spindle and feed pump, a rapid traverse pump for imparting faster movement to said actuator, driving means for said rapid traverse pump, and control means whereby the functioning of said rapid traverse pump driving means may be controlled independently of said feed pump.

16. In material working apparatus, a bearing structure, a supporting spindle rotatable within said bearing structure, a machine element, an electric motor for driving said spindle, a hydraulic actuator for imparting relative translation between the machine element and spindle, a feed pump for imparting feeding movement to said actuator, a rapid traverse pump for imparting faster movement to said actuator, a prime mover such as an electric motor for said rapid traverse pump, and control mechanism whereby the operation of the feed pump may be arrested, or the fluid delivered thereby circulated during the operative functioning of the rapid traverse pump.

17. An actuator system for machine tools and the like including a hydraulic actuator for shifting a machine part, a rotary spindle, an electric motor for rotating said spindle, a feed pump driven in synchronism with said spindle for imparting feeding movement to said hydraulic actuator, pump driving means including electrical means for synchronizing the rotative speed of said spindle and feed pump, a rapid traverse pump for imparting a faster movement to said actuator, a prime mover such as an electric motor for driving said rapid traverse pump, and control means for selectively governing the operative functioning of said pumps and for arresting the operative functioning of said rapid traverse pump during a predetermined cycle of operation of said hydraulic actuator.

18. An actuator system for machine tools and the like including a hydraulic actuator for shifting a machine part, a rotary spindle, an electric motor for rotating said spindle, a feed pump driven in synchronism with said spindle for imparting feeding movement to said hydraulic actuator, a rapid traverse pump for imparting a faster movement to said actuator, a prime mover such as an electric motor for driving said rapid traverse pump, control mechanism whereby the rotation of the spindle prime mover may be arrested without affecting the operative functioning of the rapid traverse pump motor, means for drivingly controlling said feed pump for propelling purposes and a starting and stopping valve mechanism for automatically controlling the operative effectiveness of fluid flowing from said feed pump.

19. In a hydraulic actuator system, a hydraulic actuator for propelling machine parts and the like, a low displacement high pressure pump for propelling said actuator at a feeding rate, a second pump connected with the intake side of said high pressure pump for delivering fluid thereto at a relatively high pressure which is less than the pressure developed at the discharge side of the feed pump but which is sufficient to preload the fluid within the feed pump and thereby counteract volumetric errors experienced under high pressure conditions within a pump, and means hydraulically connecting said pumps with said actuator.

20. A machine tool structure including a rotary supporting spindle, an electric motor for driving said spindle, control means for starting and stopping said motor, a reciprocable supporting carriage, a bed for said carriage, a rapid traverse transmission for said carriage, a feed transmission for causing movement of said carriage at various speeds, and remote control mechanism supported by said carriage to govern the control mechanism for starting and stopping said motor and to selectively control the operating effectiveness of said transmissions.

21. A machine tool structure including a rotary supporting spindle, an electric variable speed motor for driving said spindle, control means for starting and stopping said motor, a reciprocable supporting carriage, a bed for said carriage, a rapid traverse transmission for said carriage, a feed transmission for causing movement of said carriage at various speeds, and remote control mechanism supported by said carriage to govern the control mechanism for starting and stopping said motor and to selectively control the operating effectiveness of said transmissions.

22. A machine tool structure including a rotary supporting spindle, an electric motor for driving said spindle, control means for starting and stopping said motor, a reciprocable supporting carriage, a bed for said carriage, a hydraulic rapid traverse transmission for said carriage, a hydraulic feed transmission for causing movement of said carriage at various speeds, and remote control mechanism supported by said carriage to govern the control mechanism for starting and stopping said motor and to selectively control the operating effectiveness of said transmissions.

23. In material working apparatus, a rotary supporting spindle, a variable speed electric prime mover for driving said spindle, a shiftable supporting carriage, a frame for supporting said carriage, feed transmission for imparting movement to said carriage, an electric transmission driven by said prime mover for governing the speed of actuation of said feed transmission, and means for controlling the functioning of said prime mover.

24. In material working apparatus, a bed, a supporting carriage shiftably mounted on said bed, a plurality of fluid motors formed integral with said carriage, one of said fluid motors being adapted to propel the carriage longitudinally, and a supporting machine element translatable in a direction transverse to the direction of movement of said carriage, another of said fluid motors being adapted to propel said translatable supporting machine element.

25. In material working apparatus, a headstock structure, a rotary supporting spindle associated with said headstock structure, ball bearings for rotatably supporting said spindle in such a manner as to render said spindle operable over a wide range of rotative speeds, and a main reduction gear mounted on said spindle including means interposed between said gear and said spindle to impart a preload whereby to counteract the tendency for physical change to be experienced by the gear as a result of centrifugal force developed at high speeds.

26. In material working apparatus, a frame structure, a supporting carriage shiftable longitudinally thereof, a translatable machine element supported by said carriage, a cam member on said carriage, means for securing said cam member against longitudinal movement, a follower member abutting said cam member, positive connecting means for adjustably coupling said follower member and said machine element, and hydraulic means to maintain said follower member in engagement with said cam.

27. In material working apparatus, a unitary frame structure, a variable delivery pump supported by said frame structure, a variable speed electric prime mover such as an electric motor for driving said pump and supported by said frame structure, means for adjusting the stroke of said pump, remote control means for operating said stroke adjusting means, a constant speed large displacement pump on said frame structure, a prime mover for driving said pump, and valve means for controlling the operative effectiveness of said pumps.

28. In a hydraulic actuator system for propelling a supporting machine element and the like, a plurality of fluid operated actuators, a circuit including fluid propelling means for imparting rapid traverse to a selected actuator, a second circuit including another fluid propelling means for imparting feeding movement to one of said actuators, valve means for rendering said first fluid propelling means functionally inoperative during the functioning of said second circuit and for selecting the direction of fluid flow in said second circuit, and other valve means for selectively determining the actuator to be propelled.

29. In material working apparatus, a bearing structure, a supporting spindle rotatable within said bearing structure, a prime mover such as an electric motor for driving said spindle, and fluid pressure producing means driven by said prime mover for dispatching a measured amount of lubricant to said bearing structure in timed relation with the speed of said spindle.

30. In a hydraulic actuator system for propelling a supporting machine element and the like at relatively slow speed and under high and fluctuating fluid pressure conditions, a fluid operated actuator, a fluid circuit coupled therewith including a variable delivery plunger pump for propelling said actuator at a relatively slow speed, and a pressure balancing fluid propelling means driven in synchronism with said plunger pump for maintaining a pressure at the intake side of said plunger pump substantially the same as required to propel said actuator, whereby to maintain the pressure producing mechanism within said plunger pump in substantial balance and thereby preclude variation in propelling speed which might otherwise result from deflection of said pressure producing mechanism.

31. In a fluid transmission system and control mechanism therefor, a first fluid circuit including fluid pressure generating means therefor, a second fluid circuit including a second fluid pressure generating means, control mechanism including a shiftable plunger within a housing for determining the starting and stopping of fluid flow in said circuits, and a power circuit for driving said second fluid pressure generating means and for starting and stopping said second fluid pressure generating means including a shiftable member actuated in response to fluid flow in said first fluid circuit for conditioning the effectiveness of said second fluid circuit for propelling purposes.

32. In a fluid transmission system for machine tools and the like, a first fluid circuit including fluid pressure generating means therefor, control mechanism including a shiftable plunger within a housing for determining the starting and stopping of the fluid flow in said circuit, a second fluid circuit including a second fluid pressure generating means which is adapted to be functionally operative independent of said first fluid pressure generating means, automatically operable means for controlling the direction of fluid travel from said second fluid pressure generating means to thereby condition said second circuit for propelling purposes, a variable speed prime mover such as an electric motor for said second fluid pressure generating means, and a power circuit for driving the last named means including electrical control means for starting and stopping said prime mover and as an incident thereto the starting and stopping of fluid flow in said second circuit.

33. In a fluid transmission system for machine tools and the like, a first fluid power circuit including fluid pressure generating means therefor, driving means for said fluid pressure generating means, control mechanism for said circuit including a shiftable plunger within a housing for determining the starting and stopping of fluid flow in said circuit, a second fluid pressure generating means, driving means for said second fluid pressure generating means independent of the first mentioned driving means including a variable speed prime mover such as an electric motor, and shiftable means responsive to said control mechanism for controlling the direction of fluid travel from said second fluid pressure generating means whereby to condition said second circuit for propelling purposes.

34. In a metal working apparatus, a rotary supporting means, a transmission for delivering power to said supporting means, a second supporting means relatively movable with respect to said rotary supporting means, a shiftable actuator member for causing said relative movement, a feed transmission for delivering propelling power to said actuator member, electrical power transmitting means connecting said transmissions to effect uninterrupted synchronized movement of said transmissions, a source of power supply common to both transmissions, independent means for imparting relative rapid traverse to said actuator member without affecting said connection of said transmissions, and an electrical control mechanism including manual control means for said mechanism for governing the timed functioning of said transmissions.

35. In a metal working apparatus, a rotary supporting means, a transmission for delivering power to said supporting means, a second supporting means relatively movable with respect to said rotary supporting means, a shiftable actuator member for causing said relative movement, a feed transmission for delivering power to said actuator member, a source of propelling power supply common to both transmissions, electrical power transmitting means for coupling said transmissions for driving purposes with said source of power supply to effect uninterrupted synchronized movement of said transmissions, independent means for imparting relative rapid traverse to said actuator member without affecting said connection of said transmissions, and a control mechanism including a shiftable member within a housing for determining the starting and stopping of said independent rapid traverse.

36. In a metal working apparatus, a rotary supporting means, a transmission for delivering power to said supporting means, a second supporting means relatively movable with respect to said rotary supporting means, a shiftable actuator member for causing said relative movement, a feed transmission for delivering propelling power to said actuator member, a source of power supply common to both transmissions, a unitary magnetic controller for causing said source of power supply to effect uninterrupted synchronized movement of said transmissions, independent means for imparting relative rapid traverse to said actuator member without affecting said positive connection of said transmissions, and a second control mechanism for governing the effectiveness of said independent means for imparting relative rapid traverse.

37. In a metal working apparatus, a rotary supporting means, a transmission for delivering power to said supporting means, a second supporting means relatively movable with respect to said rotary supporting means, a shiftable actuator member for causing said relative movement, a feed transmission for delivering power to said actuator member, a source of power supply common to both transmissions, a control mechanism for connecting said transmissions for driving purposes with said source of power supply to effect uninterrupted movement of said transmissions, independent means for imparting relative rapid traverse to said actuator member, control means for governing the timed functioning of said independent means for imparting relative rapid traverse, and fluid power means for conditioning said feed transmission for propelling purposes.

38. In a metal working apparatus, a rotary supporting means, a transmission for delivering power to said supporting means, a second supporting means relatively movable with respect to said rotary supporting means, a shiftable actuator member for causing said relative movement, a feed transmission for delivering propelling power to said actuator member, electrical power means positively connecting said transmissions to effect uninterrupted synchronized movement of said transmissions when variation in load is experienced by at least one of said supporting means, a source of power supply common to both transmissions, independent means for imparting relative rapid traverse to said actuator member without affecting said positive connection of said transmissions, and a control mechanism including a remote control member for governing the timed functioning of said transmissions.

39. In a metal working apparatus, a rotary suporting means, a transmission for delivering power to said supporting means, a second supporting means relatively movable with respect to said rotary supporting means, a shiftable actuator member for causing said relative movement, an adjustable feed transmission for delivering propelling power to said actuator member, electrical power means connecting said transmissions to effect uninterrupted synchronized movement of said transmissions, a source of power supply common to both transmissions, independent means for imparting relative rapid traverse to said actuator member without affecting said connection of said transmissions, and a control mechanism including a remote control member for governing the timed functioning of said transmissions.

40. In a metal working apparatus, a rotary supporting means, a transmission for delivering power to said supporting means, a second supporting means relatively movable with respect to said rotary supporting means, a shiftable actuator member for causing said relative movement, a feed transmission for delivering propelling power to said actuator member, electrical power means connecting said transmissions to effect uninterrupted synchronized movement of said transmissions, speed change gearing for at least one of said transmissions, a source of power supply common to both transmissions, independent means for imparting relative rapid traverse to said actuator member without affecting said connection of said transmissions, and a control mechanism for said source of common power supply for governing the starting and stopping of said transmissions.

41. In a metal working apparatus, a rotary supporting means, a transmission for delivering power to said supporting means, a second supporting means relatively movable with respect to said rotary supporting means, a shiftable actuator member for causing said relative movement, an adjustable transmission driven by said rotary supporting means, electrical means for starting and stopping the rotation of said rotary supporting means, whereby to effect synchronized starting and arresting of both the adjustable transmission and the relatively movable supporting means, a source of power supply common to both transmissions, electrical synchronizing power means associated with said transmissions, independent means for imparting relative rapid traverse to said actuator member without affecting the connection between said transmissions, and a magnetic control mechanism including a remote control device for governing the timed functioning of said transmissions.

42. In a metal working apparatus, a rotary supporting means, a transmission for delivering power to said supporting means, a second supporting means relatively movable with respect to said rotary supporting means, a shiftable actuator member for causing said relative movement, a feed transmission for delivering propelling power to said actuator member, electrical synchronizing means associated with said transmissions to effect uninterrupted synchronized movement of said transmissions, an electrical prime mover such as an electric motor common to both transmissions, independent means for imparting relative rapid traverse to said actuator member without affecting said connection of said transmissions, and a magnetic control mechanism including a remote control device for said magnetic mechanism for starting and stopping said electrical prime mover.

43. In a machine tool structure, a rotary supporting spindle, driving means therefor, a reciprocable supporting member, a rapid traverse transmission for said supporting member, a slower feed transmission for propelling said supporting member independently of said rapid traverse transmission, an electrical prime mover such as an electric motor for actuating said spindle driving means and said feed transmission, electrical means for synchronizing the spindle driving means and said feed transmission, shiftable control elements for selectively causing the reciprocable member to be driven by either of said transmissions, one of said control elements being shiftable as an incident to the shifting of another of said control elements, and a remote control device adapted when shifted to given positions to cause the starting and stopping of said electrical prime mover.

44. In a machine tool structure, a rotary supporting spindle, driving means therefor, a supporting member movable in forward and reverse directions, a rapid traverse transmission for said supporting member, a slower feed transmission for propelling said supporting member independently of said rapid traverse transmission, an electrical prime mover such as an electric motor for actuating said spindle driving means and one of said transmissions, shiftable control elements for selectively causing the reciprocable member to be driven by either of said transmissions and in either forward or reverse direction, one of said control elements being shiftable as an incident to the shifting of another of said control elements, a remotely positioned initiating means adapted when shifted in a given direction to cause the starting of said electrical prime mover and when shifted in another position to cause the stopping of said electrical prime mover, and a shiftable control element operable independently of said initiating means to cause said feeding transmission to be conditioned for propelling purposes.

45. In a fluid transmission system for machine tools and the like, a first fluid circuit including fluid pressure generating means therefor, control mechanism including a shiftable plunger within a housing for determining the direction of fluid flow in said circuit and control circuit means for causing said plunger to be shifted to its reverse position, a second fluid circuit including a second fluid pressure generating means which is adapted to be functionally operable independently of said first fluid pressure generating means, a magnetic control mechanism for initiating the fluid flow in said second circuit, and fluid power means to condition the fluid flow in said second circuit for propelling purposes.

46. In a fluid transmission system for machine tools and the like, hydraulic actuator means movable in forward and reverse directions, a first fluid circuit including fluid pressure generating means for propelling said actuator means at a relatively rapid rate in forward and reverse directions, control mechanism including a shiftable control member for determining the direction of fluid flow in said circuit, power control circuit means for causing said control member to be shifted to its reverse position whereby said first fluid circuit will cause said hydraulic actuator means to move in a reverse direction, a second fluid circuit including a second fluid pressure generating means for propelling said actuator means at a slower speed in forward and reverse directions, said second fluid pressure generating means being adapted to operatively function independently of said first fluid pressure generating means, and power operated means for conditioning the fluid flow from said second fluid pressure generating means for propelling purposes.

47. In a fluid transmission system for machine tools and the like, a first fluid circuit including rapid traverse fluid pressure generating means, a second fluid circuit including slow traverse fluid pressure generating means which is adapted to be functionally operable independently of said rapid traverse fluid pressure generating means, means operable in response to the fluid flow in said first fluid circuit to render said slow traverse fluid pressure generating means functionally effective, means for reversing the fluid flow in said second circuit, and means for conditioning the fluid flow from said slow traverse fluid pressure generating means for propelling purposes.

48. A fluid transmission system for machine tools and the like, a hydraulic actuator member, two sources of fluid supply, means for conducting fluid from said sources to said actuator for propelling purposes, control means operable for enabling the fluid from both of said sources simultaneously to act upon said actuator member during a predetermined movement of said actuator member including means operable in response to the shifting of said actuator member by the action of fluid from both of said sources to enable the positive continued movement of said actuator member under the influence of fluid from only one of said sources, a unitary control means for reversing the fluid flow from both of said sources of fluid supply, and means for conditioning fluid flowing from both of said sources of fluid supply for propelling purposes.

49. In a transmission for machine tools and the like, a rotary supporting spindle, a transmission for said spindle, a supporting member relatively translatable with respect to said spindle, feed transmission for relatively translating said supporting member and spindle, rapid traverse transmission for relatively translating said supporting member and spindle independently of said feed transmission, and a magnetic control mechanism within a unitary housing for arresting the operation of said feed and spindle transmissions thereby to cause the independent translation of said supporting member by said rapid traverse transmission.

50. In a transmission for machine tools and the like, a rotary supporting spindle, a transmission for said spindle including mechanical change speed gearing, a supporting member relatively translatable with respect to said spindle, feed transmission for relatively translating said supporting member and spindle, rapid traverse transmission for relatively translating said supporting members and spindle in forward and reverse directions independently of said feed transmission, a magnetic control mechanism for arresting said feed and spindle transmissions, and another control mechanism for causing the rapid traverse transmission to impart a relative reverse movement of said supporting member independent of said feed transmission.

51. In a fluid transmission system and control mechanism therefor, a first fluid circuit including fluid pressure generating means therefor and restricted orifice means for maintaining a predetermined pressure in said circuit, a second fluid circuit including a second fluid pressure generating means adapted to move fluid as a unit in said second circuit, control mechanism within a unitary housing including a shiftable plunger within a housing for determining the starting and stopping of fluid in said second circuit and a magnetic control mechanism for starting and stopping the fluid flow in said first circuit independently of said fluid flow in said second circuit.

52. In a fluid transmission system and control mechanism therefor, a first fluid circuit including fluid pressure generating means therefor, a second fluid circuit including a second fluid pressure generating means and means for preventing leakage whereby to move fluid as a unit in said second circuit, control mechanism including a shiftable plunger within a housing for determining the starting and stopping of fluid flow in said second circuit, a magnetic control mechanism including remote control means for causing the starting and stopping of fluid flow in said second fluid circuit, and means for conditioning the fluid flowing from said second fluid pressure generating mean for propelling purposes.

53. In a hydraulic actuator system for shifting machine parts and the like, a fluid operated actuator, a fluid circuit for effecting rapid traverse of said actuator, said circuit including ducts connected with opposite sides of the actuator and fluid propelling means connected with said ducts, a second fluid circuit for imparting feeding movement to said actuator, said second circuit including a fluid propelling mechanism, the functioning of said second circuit being independent of the functioning of the first circuit, the fluid under pressure in said first circuit serving to seal the fluid in the second circuit against leakage, a magnetic control mechanism for starting and stopping the fluid flow in said second circuit independently of the fluid flow in said first fluid circuit, and means for conditioning the fluid flow from said second mentioned fluid propelling means for propelling purposes.

54. In a hydraulic actuator system for moving machine parts and the like, a fluid operated actuator, a fluid circuit including rapid traverse fluid pressure generating means for effecting rapid traverse of said actuator, said circuit including ducts connected with opposite sides of the actuator, a second fluid circuit for imparting feeding movement to said actuator, said second circuit including a fluid propelling mechanism, the functioning of said second circuit being independent of the functioning of the first circuit, the fluid in the ducts of said second circuit being sealed against leakage by the fluid pressure developed by said rapid traverse fluid pressure generating means, means for conditioning the flow of fluid from said second fluid propelling mechanism for propelling purposes, and electrical control means for the initiating and stopping of the fluid flow in said second circuit.

55. In a hydraulic actuator system for moving machine parts and the like, a fluid operated actuator, a low pressure fluid circuit connected to said actuator for imparting rapid traverse thereto in opposite directions, a high pressure fluid circuit including adjustable fluid pressure generating means connected with said actuator for imparting slower feeding movement thereto at various rates in both directions, each of said circuits being adapted to function independently of the other, means for conditioning the flow of fluid from said adjustable fluid pressure generating means for propelling purposes, and means for selectively controlling the functioning of said circuit in both directions.

56. In material working apparatus, a rotary supporting member, driving means therefor including a prime mover such as an electric motor and mechanical speed change gearing, fluid propelling mechanism driven in timed relation with said supporting member and having means for preventing slippage of fluid from the high to the low pressure side thereof, said means including valve means within said fluid propelling mechanism, magnetically actuated control means for starting and stopping said prime mover, a fluid operated actuator, ducts connecting said actuator with said fluid propelling mechanism, the fluid propelling mechanism and ducts being so arranged that fluid contained therein may be moved as a unit whereby the movement experienced by said actuator will be directly proportional to the movement of the supporting member, fluid power means to move said actuator at a faster speed, and control means for starting and stopping the fluid flow at said faster speed.

57. In material working apparatus, rotary supporting means, driving means therefor including a variable speed prime mover such as an electric motor directly coupled with said supporting means, a variable displacement plunger pump driven in synchronism with said supporting means, magnetically actuated control means for starting and stopping the rotation of said prime mover, said plunger pump being operable automatically when rotation is imparted to said prime mover, and a mechanical remote control device including cam means for controlling said starting and stopping means.

58. An apparatus of the class described including a spindle, a fluid operated actuator, and a fluid propelling mechanism having means provided therein for sealing against leakage whereby to adapt said mechanism to impart a speed to said actuator which is constantly proportional to the speed of movement of said spindle, said propelling mechanism and actuator being included within a closed fluid circuit, said propelling mechanism being operable automatically in response to the rotation of said spindle, a variable speed prime mover such as an electric motor for driving said spindle and said propelling mechanism including magnetically actuated control means for starting and stopping said prime mover, speed change gearing associated with said prime mover, and other means for controlling the speed of said prime mover.

59. In material working apparatus of the class described, a rotary supporting means, an electrical prime mover therefor such as an electric motor, a variable delivery fluid propelling mechanism driven by said rotary means, a shiftable carriage, a fluid operated actuator for moving said carriage, one extremity of said actuator being connected with the intake side of said fluid propelling mechanism and the opposite extremity of said actuator being connected to the outlet side of said mechanism, a second carriage, a fluid operated actuator for moving said second carriage, a valve mechanism for controlling the delivery and direction of fluid power from said first fluid operated actuator to said second fluid operated actuator, a rapid traverse pump providing the source of rapid traverse fluid for both of said actuators, and control means for controlling the direction, starting, and stopping of fluid from said rapid traverse pump to said actuators.

60. In material working apparatus of the class described, a prime mover such as an electric motor, a hydraulic actuator including a piston within a cylinder, a plunger pump driven in timed relation with said prime mover, electrical transmission means for governing said timed relation, said plunger pump including shiftable pressure generating plungers, actuating means for said plungers, and means interposed between said actuating means and said plungers for causing the plungers to experience substantially uniform acceleration and deceleration during the compression stroke thereof, whereby to impart a linear speed to the actuator which is constantly in synchronism with the speed of travel of said prime mover, fluid conducting means free from air connecting said plunger pump with said hydraulic actuator, a control mechanism for starting and stopping said prime mover, and another control mechanism for controlling the speed of said prime mover.

61. In material working apparatus of the class described, a prime mover such as an electric motor, a hydraulic actuator including a piston within a cylinder, a plunger pump driven in timed relation with said prime mover, electrical transmission means for governing said timed relation, said plunger pump including shiftable pressure generating plungers, actuating means for said plungers, means interposed between said actuating means and said plungers for causing the plungers to experience substantially uniform acceleration and deceleration during the compression stroke thereof, whereby to impart a linear speed to the actuator which is constantly proportional to the speed of travel of said prime mover, fluid conducting means free from air connecting said plunger pump with said hydraulic actuator, means for imparting rapid movement to said actuator, control mechanism for starting and stopping said prime mover, and another control mechanism for controlling the speed of said prime mover.

62. In a hydraulic actuator system for controlling the movement of machine parts and the like, a hydraulic actuator including a piston within a cylinder, fluid propelling mechanism for delivering fluid under relatively high pressure to propel the actuator at a feeding rate, a second relatively low pressure fluid propelling mechanism for propelling said actuator piston at a rapid rate, shiftable valve means for selectively controlling the delivery of fluid from the low pressure means to the actuator, said valve means serving in one shifted position to render said propelling mechanism functionally inoperative for propelling purposes with respect to said hydraulic actuator, restriction means for receiving fluid discharged from said actuator during the rapid traverse movement thereof, whereby, upon the termination of the movement of the actuator at a rapid rate, the high pressure fluid is maintained operative for propelling purposes during the feeding movement of said actuator, a variable speed prime mover including a magnetic control mechanism for starting and stopping said high pressure fluid propelling mechanism, and electrically actuated means for rapidly stopping the prime mover, including means for rendering the stopping effectiveness of said electrically actuated means variable.

63. In a hydraulic actuator system for controlling the movements of machine parts and the like, a hydraulic actuator including a piston and cylinder relatively movable with respect to each other, fluid pressure generating means for delivering fluid at a relatively rapid rate to said cylinder, fluid pressure generating means for delivering fluid at a slower rate to said cylinder, a variable speed prime mover such as an electric motor for driving said slow rate fluid pressure generating means, control means for starting and stopping said variable speed prime mover including other control means for varying the speed of the prime mover, electrically actuated means for rapidly stopping the prime mover, said electrically actuated means including means for rendering the stopping effectiveness thereof variable, a fluid reservoir, a shiftable valve adapted in one position to allow the by-passing of fluid from said first mentioned fluid pressure generating means into said reservoir and to connect the second fluid pressure generating means in a closed circuit with said actuator, and means for restricting the flow of fluid returned to said reservoir.

64. In material working apparatus of the class described, a rotary supporting member, a variable displacement pump driven in timed relation with said supporting member, a transmission for said rotary supporting member, a fluid operated actuator, ducts connecting said actuator with said pump, said ducts and pump being so arranged that the movement experienced by the actuator will be directly proportional to the degree of rotation of said rotary supporting member, means for adjusting the displacement of said pump, a variable speed electrical prime mover for driving said rotary supporting member, speed change gearing, and electrical control means for varying the speed of said prime mover.

65. In a hydraulic actuator system for moving machine parts and the like, a fluid operated actuator, a low pressure fluid circuit connectable with said actuator for imparting rapid traverse thereto, a high pressure fluid circuit connectable with said actuator for imparting slower feeding movement thereto, each of said circuits being adapted to function independently of the other, means for selectively controlling the functioning of said circuits including valve means for conditioning the fluid flow in said high pressure circuit for propelling purposes, and electrical power means for starting and stopping the fluid flow in said high pressure fluid circuit.

66. In a hydraulic actuator system for moving machine parts and the like, a fluid operated actuator, a circuit including fluid propelling means for imparting rapid traverse to said actuator, a second circuit including a fluid propelling means for imparting feeding movement to said actuator, means for rendering said first mentioned circuit functionally inoperative during the functioning of said second circuit, whereby the fluid in said second circuit will impart feeding movement to the actuator independently of said first mentioned circuit, electrical power means for starting and stopping the fluid flow in said second fluid circuit, and means for conditioning the fluid flow from said second fluid propelling means for propelling purposes.

67. In a hydraulic actuator system for moving machine parts and the like, a fluid operated actuator, a circuit including fluid propelling means for imparting rapid traverse to said actuator, a second circuit including a fluid propelling means for imparting feeding movement to said actuator, a valve mechanism for controlling the starting and direction of said first mentioned circuit and for rendering said second circuit operable for propelling purposes, means for conditioning the fluid flow from said second fluid propelling means for propelling purposes, and electrical power means for starting and stopping the fluid propelling means in said second circuit.

68. In a hydraulic actuator system for moving machine parts and the like, a fluid operated actuator, a circuit including fluid propelling means for imparting rapid traverse to said actuator, a second circuit including a fluid propelling means for imparting feeding movement to said actuator, a variable speed prime mover such as an electric motor for actuating and starting and stopping the propelling mechanism in said second circuit, means operable in response to the functioning of said first mentioned circuit for conditioning the fluid flow in the second mentioned circuit for propelling purposes, and a control mechanism for said electrical prime mover.

69. In a material working apparatus, rotary supporting means, a variable speed prime mover such as an electric motor directly coupled with said supporting means, a variable displacement plunger pump driven in response to the rotation of said prime mover, means for conditioning the fluid flow from said variable plunger pump for propelling purposes, and magnetically actuated control means for starting and stopping said prime mover whereby said plunger pump is operable automatically when rotation is imparted to said prime mover.

70. In material working apparatus, a rotary supporting means, a prime mover such as an electric motor having its shaft directly coupled in line with said supporting means, a fluid propelling mechanism driven in timed relation with said supporting means, a fluid operated actuator, said fluid propelling mechanism being adapted to impart a speed to said fluid operated actuator which is constantly proportional to the rotary speed of said rotary supporting means, ducts connecting said fluid propelling mechanism with said actuator whereby, in response to rotation of the supporting means, the fluid propelling mechanism operates automatically to propel the actuator, and electrical control means for starting and stopping said prime mover.

71. In material working apparatus, a spindle, a variable speed electrical prime mover such as an electric motor having its shaft directly coupled in line with said spindle, a fluid operated actuator, a fluid propelling mechanism adapted to impart a speed to the fluid operated actuator which is constantly proportional to the speed of movement of said spindle, said propelling mechanism and actuator being included within a closed fluid circuit, and a magnetically actuated means for starting and stopping said prime mover and, as an incident thereto, the starting and stopping of said fluid propelling mechanism.

72. In material working apparatus, a rotary supporting spindle, a variable speed prime mover such as an electric motor having its shaft directly coupled in line with said spindle, fluid pressure generating means driven in timed relation with said spindle, a tool support, fluid actuated means for moving said tool support, ducts connecting said fluid actuated means with said fluid pressure generating means, the fluid in said ducts being sealed against leakage from the system whereby a predetermined movement of the tool supporting means is experienced in response to each revolution of the supporting spindle, and magnetically actuated means for starting and stopping said prime mover and, as an incident thereto, the starting and stopping of said fluid pressure generating means.

73. In material working apparatus, a supporting spindle, a prime mover such as an electric motor having its shaft coupled directly in line with said spindle, a fluid operated actuator piston, fluid pressure generating means driven in timed relation with said supporting spindle, said fluid pressure generating means and actuator piston being included within a closed circuit, the linear movement of the actuator piston being constantly proportional to the degree of movement experienced by said spindle, and magnetically actuated means for starting and stopping said prime mover and, as an incident thereto, the starting and stopping of said fluid pressure generating means.

74. In material working apparatus, a frame, a spindle rotatably mounted in said frame, an electrical prime mover such as an electric motor having its shaft coupled directly in line with said spindle, fluid pressure generating means, a fluid operated actuator, said fluid pressure generating means and actuator being included within a closed circuit, means for driving said fluid pressure generating means in timed relation with said spindle, whereby the movement experienced by said actuator will be constantly in direct relation with the rotary movement experienced by the spindle, and magnetically actuated means for starting and stopping said prime mover and, as an incident thereto, the starting and stopping of said fluid pressure generating means.

75. In material working apparatus, a frame, a spindle rotatably supported by said frame, an electrical prime mover such as an electric motor coupled directly with said spindle, a fluid propelling mechanism adapted to impart a speed to a fluid operated actuator which is constantly proportional to the rotative speed of said spindle, a fluid operated actuator connected with said fluid propelling mechanism by means of ducts, whereby uniform movement of said actuator is experienced irrespective of variations in fluid pressure in the opposite sides thereof, electrical power driving means directly connecting said prime mover with said fluid propelling mechanism for driving purposes, whereby the rotation of said prime mover will automatically cause the operation of said fluid propelling mechanism, and a magnetically actuated control means for starting and stopping said prime mover including remote control means for said magnetically actuated control.

76. In material working apparatus, a rotary supporting means, a prime mover such as an electric motor having its shaft directly coupled in line with said rotary supporting means, a variable displacement pump driven in synchronism with the rotary supporting means, a fluid operated actuator connected with said variable displacement pump, an adjustable gear pump connected with said fluid operated actuator, whereby the displacement of low pressure fluid to said actuator may be adjustably controlled, means for selectively controlling the functioning of said pumps with respect to said actuator, and magnetically actuated means for controlling the starting and stopping of said prime mover including remote control means for said magnetically actuated control.

77. In material working apparatus, the combination with a rotary supporting means and a fluid operated actuator, a prime mover such as an electric motor having its shaft directly coupled in line with said rotary supporting means, a variable displacement pump for delivering fluid at high pressure to said actuator, a constantly driven gear pump for delivering fluid at low pressure to said actuator, means for varying the delivery of said gear pump to thereby vary the speed of said actuator while the cooperative relationship of the teeth in the gears remain undisturbed, and a magnetically actuated means for starting and stopping said prime mover independently of said gear pump including remote control means for said magnetically actuated means.

78. In a hydraulic actuator system for moving machine parts and the like, a fluid operated actuator, a low pressure circuit connectable with said actuator for imparting rapid traverse thereto, a high pressure fluid circuit connectable with said actuator for imparting a slower feeding movement thereto, one of said circuits being adapted to function independently of the other, a second fluid operated actuator connected with said low and high pressure circuits, a magnetically actuated control means for starting and stopping the fluid flow in said high pressure circuit, and other control means for starting and stopping the fluid flow in said low pressure fluid circuit and for conditioning the fluid flow in said high pressure fluid circuit for propelling purposes.

79. In a hydraulic actuator system for moving machine parts and the like, a fluid operated actuator, a low pressure circuit connectable with said actuator for imparting rapid traverse thereto, a high pressure fluid circuit connectable with said actuator for imparting a slower feeding movement thereto, one of said circuits being adapted to function independently of the other, a second fluid operated actuator connected with said low and high pressure circuits, a valve mechanism for controlling the functioning of said circuits with respect to both of the fluid actuators, and another valve mechanism including fluid channels for controlling the direction of fluid dispatchment between said first fluid actuator and said second fluid actuator.

80. In a hydraulic actuator system for moving machine parts and the like, a fluid operated actuator, a low pressure circuit connected to said actuator for imparting rapid traverse thereto, a high pressure fluid circuit connected with said actuator for imparting a slower feeding movement thereto, one of said circuits being adapted to function independently of the other, a second fluid operated actuator connected with said low and high pressure circuits, a valve mechanism including a shiftable plunger within a housing connected within the low pressure circuit for rendering said circuit functionally inoperable during the functioning of the high pressure circuit, and magnetically actuated control means for starting and stopping the fluid flow in said high pressure fluid circuit including a shiftable member actuated in response to the fluid flow in said low pressure circuit for conditioning the fluid flow in said high pressure circuit for propelling purposes.

81. In material working apparatus, a rotary supporting means, a variable speed electrical prime mover such as an electric motor having its shaft coupled directly in line with said rotary supporting means, a variable delivery fluid propelling mechanism driven in synchronism with said rotary supporting means, a shiftable carriage, a fluid operated actuator for moving said carriage, one extremity of said actuator being connected with the intake side of said fluid propelling mechanism, and the opposite extremity of said actuator being connected with the outlet side of said mechanism, a second carriage, a fluid operated actuator for moving said second carriage, and a magnetically actuated control mechanism including manual remote control means for said mechanism for governing the starting and stopping of said variable speed electrical prime mover.

82. In material working apparatus, a frame, a supporting spindle rotatable within said frame, an electrical prime mover directly coupled with said spindle, a carriage shiftable transversely of said spindle, a fluid operated actuator for moving said carriage, a propelling mechanism driven in synchronism with said spindle for delivering fluid to said actuator, a second carriage supporting said first carriage and shiftable axially of said spindle, a second fluid operated actuator for shifting said carriage, and a valve mechanism supported by said second carriage and having a fluid channel within said second carriage connectable with said second fluid operated actuator and arranged to control the starting and direction of fluid displacement from said second fluid operated actuator to said first fluid operated actuator.

83. A system of hydraulic control including a hydraulic actuator, a relatively high pressure pumping mechanism for imparting feeding movement to said actuator, a variable speed prime mover drivingly connected to said relatively high pressure pumping mechanism, electrical power transmission means connecting said prime mover with said pumping mechanism, a second pumping mechanism for imparting rapid traverse to said actuator, a shiftable control mechanism adapted in one shifted position to direct fluid from the first mentioned pump for feeding purposes to said actuator independently of said second mentioned pumping mechanism, and a magnetically actuated means for starting and stopping said prime mover.

84. A system of hydraulic control including a hydraulic actuator, a relatively high pressure pumping mechanism for imparting feeding movement to said actuator, a variable speed electrical prime mover such as an electric motor for driving said relatively high pressure pumping mechanism, a second pumping mechanism for imparting rapid traverse to said actuator, a control mechanism for rendering the second pumping mechanism functionally inoperative for propelling purposes with respect to the actuator during the functioning of the first mentioned pumping mechanism, means for conditioning the fluid flow from said high pressure pumping mechanism for propelling purposes, and manual control means for varying the speed of said prime mover.

85. In a hydraulic actuator system for moving machine parts and the like, a hydraulic actuator including a piston within a cylinder, fluid propelling means for imparting feeding movement to said actuator, a variable speed electrical prime mover for driving said fluid propelling means, a second fluid propelling means for imparting rapid traverse to said actuator, an electrical control means for starting and stopping and varying the speed of said prime mover such as an electric motor, valve means for rendering the second mentioned propelling means functionally inoperative for propelling purposes with respect to the actuator piston during the operative functioning of the other propelling means, and means responsive to a preselected pressure condition in the fluid from said first fluid propelling means to effect the reversal of the actuator.

86. In a hydraulic actuator system for moving machine parts and the like, a hydraulic actuator including a piston within a cylinder, a variable displacement plunger pump for delivering fluid under pressure at a substantially uniform rate to one side of the actuator piston, means for directing fluid from the opposite side of said piston to the intake side of said variable displacement plunger pump, the fluid from the discharge side of said actuator being sufficient to charge the intake side of said plunger pump, whereby said actuator experiences constant linear travel in accordance with the uniform delivery of fluid by said plunger pump, a variable speed electrical prime mover coupled with said variable displacement plunger pump, remote control mechanism for varying the displacement of said plunger pump, and electrically actuated control means for starting and stopping and varying the speed of said motor including manual remote control for shifting said means.

87. In a hydraulic actuator system for moving machine parts and the like, a prime mover, a hydraulic actuator including a piston within a cylinder, mechanism for delivering fluid under pressure at a substantially uniform rate of displacement to one side of said actuator piston, electrical transmission means connecting said prime mover with said fluid delivery mechanism, passageways connecting said fluid delivery mechanism with said hydraulic actuator, whereby fluid delivered to the intake side of the actuator and fluid from the discharge side of said actuator will be shifted as confined fluid bodies within said passageways without the presence of air so that the linear speed to which the actuator is subjected will be constantly proportional to the speed of movement of said prime mover, and a magnetically actuated control means for starting and stopping said prime mover including remotely positioned manual means for actuating said magnetically actuated means.

88. In material working apparatus of the class described, a variable speed prime mover, a hydraulic actuator including a piston within a cylinder, fluid propelling mechanism driven in timed relation with said prime mover and adapted to impart a linear speed to the actuator which is constantly in synchronism with the speed of travel of said prime mover, fluid conducting means free from air connecting said fluid propelling mechanism with said hydraulic actuator, magnetically actuated control means for starting and stopping said prime mover, other means for varying the speed of said prime mover, and electrically actuated means for rapidly stopping said prime mover, including means for varying the effectiveness of said electrically actuated means.

89. In material working apparatus of the class described, a prime mover, a hydraulic actuator including a piston within a cylinder, fluid propelling mechanism driven in timed relation with said prime mover and adapted to impart a linear speed to the actuator which is constantly proportional to the speed of travel of said prime mover, fluid conducting means free from air connecting said fluid propelling mechanism with said hydraulic actuator, means for imparting rapid traverse to said actuator, another prime mover for driving said rapid traverse means, control mechanism for governing the starting and stopping of one of said prime movers in timed relation with the shifting of said hydraulic actuator, and electrically actuated means for rapidly stopping one of said prime movers including means for varying the effectiveness of said electrically actuated means.

90. In a hydraulic actuator system for controlling the movement of machine parts and the like, a hydraulic actuator including a piston within a cylinder, fluid propelling mechanism for delivering fluid under relatively high pressure to propel the actuator at a feeding rate, a prime mover, such as an electric motor, drivingly connected to said fluid propelling mechanism, a second relatively low pressure fluid propelling mechanism for propelling said actuator piston at a rapid rate, shiftable valve means for selectively controlling the delivery of fluid from the low pressure mechanism to the actuator, said valve means serving in one shifted position to operatively connect the low pressure propelling mechanism with the actuator and in another shifted position to render said propelling mechanism functionally inoperative for propelling purposes with respect to said hydraulic actuator, and a magnetically actuated control means for starting and stopping said prime mover including a mechanical remote control device having cam means for causing the shifting of said magnetically actuated means in timed relation with said actuator.

91. In material working apparatus of the class described, a support, a spindle rotatable within said support, a variable speed electrical prime mover directly coupled with said spindle, a plurality of shiftable machine elements, an actuator coupled with each of said elements, a transmission driven in timed relation with said spindle and serving to propel all of said actuators, control means for varying the speed of said prime mover, the speed of said transmission being varied as an incident to the variation in the speed of said prime mover, and remote control means for varying the ratio between the rotation of said spindle and the shifting of said machine elements.

92. In material working apparatus of the class described, a prime mover, such as an electric motor, a plurality of shiftable machine elements, an actuator for each of said shiftable elements, a transmission drivingly coupled with said prime mover for propelling said actuators, means for adjustably varying the speed between said prime mover and said transmission, other means for synchronizing the speed of said prime mover and transmission after said adjustment between said prime mover and said transmission has been made, and control means for determining either the simultaneous shifting of said machine elements or the successive shifting of the aforesaid machine elements.

93. A hydraulic actuator system comprising a hydraulically operated actuator, a low pressure circuit for imparting rapid traverse to said actuator, a high pressure circuit for imparting slower feeding movement thereto, a valve mechanism including a plunger within a housing in the low pressure circuit for controlling the movement of said actuator, another control plunger within said high pressure circuit shiftable in response to the movement of said first valve plunger for controlling the operative direction of said high pressure circuit, another valve plunger shiftable in response to fluid flow in the low pressure circuit rendering said high pressure circuit functionally operative, and means for conditioning the fluid flow in said high pressure circuit for propelling purposes.

94. In a hydraulic actuator system for controlling the movements of machine parts and the like, a hydraulic actuator including a piston and cylinder relatively movable with respect to each other, a rotary spindle, an electrical prime mover such as an electric motor having its shaft directly coupled in line with said spindle, a feed pump driven in synchronism with said spindle, said feed pump being connected with said actuator for propelling same at a feeding rate, means for imparting rapid movement to said actuator, and means for effecting the arresting of the movement of the prime mover and consequently the flow of fluid from the feed pump to said actuator during the rapid traverse of said actuator.

95. In material working apparatus of the class described, an electrical prime mover such as an electric motor having its shaft, a supporting spindle directly connected in line therewith, a fluid propelling mechanism driven in timed relation with said supporting spindle, a fluid operated actuator, means connecting said fluid propelling mechanism with said actuator in a closed circuit, whereby a governed amount of travel is experienced by the actuator for each revolution of the supporting spindle, and magnetically actuated control device for starting and stopping said prime mover including manual remote control means for causing the actuation of said control device means.

96. In material working apparatus of the class described, a frame, a spindle rotatably mounted in said frame, an electrical prime mover directly coupled with said spindle, a fluid propelling mechanism adapted to impart a speed to a fluid operated actuator which is constantly proportional to the rotative speed of said spindle, a fluid operated actuator connected with said fluid propelling mechanism by means of ducts presenting a closed circuit, whereby uniform movement of said actuator is experienced irrespective of variations in fluid pressure in the opposite sides thereof, and electrical control means for drivingly synchronizing said fluid propelling mechanism with said prime mover whereby rotation of said prime mover will automatically cause fluid to be propelled by said propelling mechanism and shift said fluid operated actuator.

97. In a hydraulic actuator system for moving machine parts and the like, a fluid operated actuator, a circuit including fluid propelling means for imparting rapid traverse to said actuator, a second circuit including a fluid propelling means for imparting feeding movement to said actuator, means for actuating the propelling mechanism in said second circuit, means operable in response to the functioning of one of said circuits for conditioning the other of said circuits for propelling purposes, means for conditioning the fluid flow from said second fluid propelling means for propelling purposes and magnetically actuated means for starting and stopping the fluid flow in one of said circuits.

98. In a hydraulic actuator system for moving machine parts and the like, a fluid operated actuator, a low pressure circuit connected to said actuator for imparting rapid traverse thereto, a high pressure fluid circuit connected with said actuator for imparting a closed feeding movement thereto, each of said circuits being adapted to function independently of the other, a second fluid operated actuator connected with said low and high pressure circuits, a single valve mechanism for controlling the operative functioning of one of said circuits and for conditioning the fluid flow in the other of said circuits for propelling purposes, and magnetically actuated means for starting and stopping the fluid flow in said other of said circuits.

99. A system of hydraulic control including a hydraulic actuator, a relatively high pressure pumping mechanism for imparting feeding movement to said actuator, a variable speed electrical prime mover drivingly connected to said high pressure pumping mechanism, a second pumping mechanism for imparting rapid traverse to said actuator, a shiftable control mechanism for said second pumping mechanism comprising a member shiftable within a casing adapted in one shifted position to direct fluid from the second pumping mechanism to said actuator and for conditioning a fluid flow from said high pressure pumping mechanism for propelling purposes, and other control means for starting and stopping said prime mover.

100. A system of hydraulic control including a hydraulic actuator, a relatively high pressure pumping mechanism for imparting feeding movement to said actuator, a variable speed electrical prime mover drivingly connected with said high pressure pumping mechanism, a second pumping mechanism for imparting rapid traverse to said actuator, a control mechanism for rendering the second pumping mechanism functionally inoperative for propelling purposes with respect to the actuator during the functioning of the first mentioned pumping mechanism and for rendering the first pumping mechanism operative for propelling said hydraulic actuator in either direction, means for conditioning the fluid flow from said relatively high pressure pumping mechanism for propelling purposes and other control means for starting and stopping said prime mover.

101. In combination with a rotary supporting spindle a variable speed electrical prime mover directly coupled with said spindle, a system of hydraulic control including a hydraulic actuator, a feed pump for imparting feeding movement to said actuator, a rapid traverse pump for imparting rapid movement to said actuator, pump driving means, and a shiftable control mechanism for controlling the stopping of the prime mover and for controlling the operative effectiveness of said pumps, said control mechanism in one shifted position causing the stopping of the prime mover, the simultaneous stopping of the flow of fluid from the feed pump to the actuator for propelling purposes and permitting the simultaneous delivery of fluid in a reverse direction to said actuator from said rapid traverse pump.

102. A system of hydraulic control including a hydraulic actuator comprising a relatively shiftable piston and cylinder construction, pumping means for imparting movement to said actuator, valve means for controlling the starting and reversal of said actuator, and control means hydraulically coupled with said actuator and with said valve means for controlling the timed shifting of said valve means to effect the reversal of said actuator in response to a preselected pressure condition in said hydraulic actuator and other pumping means for imparting independent and variable movement to said actuator in forward and reverse directions.

103. In a machine tool structure, a rotary supporting spindle, electrical prime mover coupled with said spindle, a reciprocable supporting member, a rapid traverse transmission for actuating said supporting member, a slow feeding transmission for propelling said supporting member independently of said rapid traverse transmission, power circuit means between said electrical prime mover and said feed transmission, other power means for driving said rapid traverse transmission, shiftable control elements for selectively causing the reciprocable member to be driven by either of said transmissions, initiating members adapted to act upon said control elements to cause a preselected shifting of said control elements, a control circuit between one of the driving transmissions and said shiftable control elements for causing a reversal of said reciprocable supporting member in response to a preselected load condition within one of said transmissions, and magnetically actuated means for starting and stopping said electrical prime mover.

104. In a machine tool structure, a rotary supporting spindle, variable speed electrical prime mover coupled with said spindle, a reciprocable supporting member, a rapid traverse transmission for actuating said supporting member, a slow feeding transmission for propelling said supporting member independently of said rapid traverse transmission, a power circuit between said prime mover and said slow feeding transmission including means for driving said slow feeding transmission in synchronism with said prime mover, shiftable control elements for selectively causing the reciprocable member to be driven by either of said transmissions, initiating members adapted to act upon said control elements to cause a preselected shifting of said control elements, one of said initiating members being shiftable in response to a preselected load condition within one of said transmissions, and magnetically actuated means for starting and stopping said electrical prime mover.

105. In a machine tool structure, a rotary supporting spindle, a variable speed electrical prime mover therefor, a reciprocable supporting member, a rapid traverse transmission for actuating said suppoting member, a slower feeding transmission for propelling said supporting member independently of said rapid traverse transmission, including a power circuit between said electrical prime mover and said feed transmission for driving, starting and stopping said feed transmission in synchronism with said electrical prime mover, shiftable control elements for selectively causing the reciprocable member to be driven by either of said transmissions, initiating members adapted to act upon said control elements to cause a preselected shifting of said control elements, means within one of said control elements responsive to a preselected load condition within said slower feeding transmission for causing a reversal of said reciprocable supporting member, and a magnetically actuated control mechanism for controlling the starting and stopping of said prime mover and manual control means for controlling the speed of said prime mover.

106. In a machine tool structure, a rotary supporting spindle, a variable speed electrical prime mover directly coupled with said spindle, a reciprocable supporting member, a rapid traverse transmission for actuating said supporting member, a slower feeding transmission for propelling said supporting member independently of said rapid traverse transmission, means cooperatively associated with one of said transmissions for blocking the driving connection of one of said transmissions during the functioning of the other of said transmissions, shiftable control elements for selectively causing the reciprocable member to be driven by either of said transmissions, initiating members adapted to act upon said control elements, and means within one of said control elements connectable with the driving power from one of said transmissions when a preselected load condition in one of said transmissions occurs for causing a reversal of said reciprocable supporting member.

107. In a machine tool structure, a rotary supporting spindle, driving means therefor, a reciprocable supporting member, a rapid traverse transmission for said supporting member, a slower feed transmission for propelling said supporting member independently of said rapid traverse transmission, power means for actuating said spindle driving means and said transmissions, shiftable control elements for selectively causing the reciprocable member to be driven by either of said transmissions independently, initiating members movable in synchronism with said reciprocable supporting member and adapted to act upon said control elements to cause a preselected shifting of said control elements, and means within one of said shiftable control elements for disconnecting the effective driving power of said feed transmission in response to a preselected load condition within said feed transmission and causing said reciprocable supporting member to be shifted in a reverse direction.

108. In a fluid transmission system for machine tools and the like, a first fluid circuit including fluid power generating means therefor, control mechanism including a shiftable plunger within a housing for determining starting and stopping of the fluid flow in said circuit, a second fluid circuit having a second fluid power generating means and including a shiftable plunger within said control housing for starting and directing the fluid flow in said second circuit, a power circuit including control means for causing said second fluid power generating means to be driven at variable speeds, and magnetically actuated starting and stopping means for said power circuit.

109. In a fluid transmission system for machine tools and the like, a first fluid circuit including fluid power generating means therefor, control mechanism including a shiftable plunger within a housing for determining starting and stopping of the fluid flow in said circuit, a second fluid circuit having a second fluid power generating means and including a shiftable plunger within said control housing for starting and directing the fluid flow in said second circuit, means for conditioning the fluid flow from said second fluid power generating means for propelling purposes, a variable speed electrical prime mover connectable with said second fluid power generating means, magnetically actuated control means for starting and stopping said prime mover, and other electrical control means for regulating the speed of said prime mover and causing as an incident to said speed regulation the regulation of the fluid flow in said second circuit.

110. In a fluid transmission system for machine tools and the like, a first fluid circuit including fluid power generating means therefor, control mechanism including a shiftable plunger within a housing for determining starting and stopping of the fluid flow in said circuit, a second fluid circuit having a second fluid power generating means and including a shiftable plunger within said control housing for directing the fluid flow in said second circuit, a fluid control circuit for automatically actuating the shiftable plunger in said second circuit, and a shiftable member responsive to the fluid flow in said first circuit for conditioning the fluid flow in said second circuit for propelling purposes.

111. In a fluid transmission system for machine tools and the like, a first fluid power circuit including a large volume fluid power generating means therefor, control mechanism including a shiftable plunger within a housing for determining starting and stopping of the fluid flow in said circuit, a second variable flow fluid circuit including an adjustable flow fluid power generating means therefor, a shiftable plunger within said control housing for directing the fluid flow in said second circuit, a shiftable member responsive to the pressure condition of the fluid flow in said first circuit for conditioning the fluid flow in said second circuit for propelling purposes, and a fluid control circuit responsive to the shifting of said first shiftable valve plunger for shifting said second shiftable valve plunger.

112. A control mechanism for fluid power circuits and the like adapted to receive fluid from an associated fluid power generating means, a shiftable plunger within said control mechanism for directing dispatchment of fluid in at least two directions, means responsive to a preselected pressure condition in one of said fluid power circuits for enabling the shifting of said plunger by fluid power in at least one direction, a second fluid actuated plunger within said control mechanism for causing a modified fluid dispatchment in forward and reverse directions selected by said first plunger, a variable electrical power circuit for automatically further modifying said fluid dispatchment, and magnetically actuated control means for controlling the starting and stopping of said power circuit.

113. A control mechanism for fluid power circuits and the like adapted to receive fluid from an associated fluid power generating means, a shiftable plunger within said control mechanism for directing dispatchment of fluid in at least two directions, means for enabling the shifting of said plunger by fluid power in at least one direction in response to a preselected pressure condition within one of said power circuits including means for adjusting said preselected condition, a second plunger means within said control mechanism for causing a modified fluid dispatchment in forward and reverse directions selected by said first plunger, and fluid power means for controlling said second plunger means.

114. A control mechanism for fluid power circuits and the like adapted to be controlled in response to action of fluid power directed by said mechanism, a shiftable fluid directing plunger within said control mechanism for starting a fluid flow and reversing said flow, means associated with said directing plunger to cause a shifting of said plunger by fluid power in at least one direction in response to a preselected pressure condition within one of said circuits, a second plunger means within said control mechanism for causing a variable fluid dispatchment in a direction selected by said first plunger, fluid power means for controlling said second plunger means, means engageable for timingly controlling the shifting of at least one of said plungers under the influence of fluid power, and an electrical power circuit for further modifying said variable fluid dispatchment.

115. In a fluid power generating structure, a unitary supporting frame including a fluid reservoir integral with said frame, a main drive shaft rotatably mounted in said supporting frame, a large delivery fluid pressure generating means driven by said drive shaft, a fluid channel between said reservoir and the intake of said large fluid pressure generating means, an adjustable relatively small displacement fluid pressure generating means, a variable speed electrical prime mover drivingly connected to said small displacement generating means, and valve means secured to said unitary supporting frame and connected to said large and small fluid pressure generating means, said valve and said adjustable small displacement pump being arranged for mechanical remote control connection, whereby direction of fluid flow and starting and stopping including adjustment of said relatively small displacement pump may be remotely controlled.

116. A control mechanism for fluid power circuits and the like adapted to be controlled in response to action of fluid power controlled by said mechanism, a shiftable fluid directing plunger within said control mechanism for initiating a fluid flow and for causing a reversal of said flow, a second shiftable plunger means for causing a variation in amount of the flow as initiated by said first fluid plunger, and an electrical power circuit including control means therefor adapted to act upon a fluid pressure generating means in one of said fluid power circuits to cause a further variation in the amount of fluid flow in said initiated direction.

117. In a fluid transmission system for machine tools and the like, a fluid power circuit including fluid pressure generating means therefor, control mechanism including a shiftable plunger within a housing for determining the starting and stopping of the fluid in said circuit, a plurality of actuators connectable with and shiftable by the fluid power in said circuit, a second fluid power circuit including adjustable fluid pressure generating means therefor, a second shiftable plunger within said housing for causing said second circuit to function in response to action by said first circuit, and an electrical power circuit including control means for driving said adjustable fluid pressure generating means at variable speeds including an electrical control means for varying said speed and thereby further varying the fluid flow in said second circuit.

118. In material working apparatus, a bearing structure, a supporting spindle rotatable within said bearing structure, a machine element, said spindle and machine element being relatively translatable, an electric motor for driving said spindle, selective means for coupling said supporting spindle directly with said electric motor, propelling mechanism for imparting relative translation between said machine element and spindle, and electrical transmission interposed between said motor and said propelling mechanism for synchronizing the rotation of speed of the spindle and the translating effectiveness of said propelling mechanism.

119. In material working apparatus, a bearing structure, a supporting spindle rotatable within said bearing structure, a machine element, said spindle and machine element being relatively translatable, an electric motor for driving said spindle, actuator means for imparting relative translation between the spindle and the machine element, an electric motor for controlling the operation of said actuator means, and electric synchronizing means including means driven by said first electric motor and electrical transmission means connected with the motor which controls the actuator means, whereby to synchronize the rotative speed of the spindle and the speed of translation of said actuator means.

120. In material working apparatus, a bearing structure, a supporting spindle rotatable within said bearing structure, a machine element, said spindle and machine element being relatively translatable, an electric motor for driving said spindle and adapted for direct coupling with said spindle and to rotate said spindle at a speed of at least 3,000 revolutions per minute, propelling mechanism for imparting relative translation between said machine element and spindle, electrical transmission interposed between said motor and said propelling mechanism for synchronizing the rotative speed of the spindle and the translating effectiveness of said propelling mechanism, and electrical braking means for rapidly bringing said motor to a stop.

121. In a machine tool such as a lathe, a bearing structure, a supporting spindle rotatable within said bearing structure, an electrical prime mover for rotating said spindle, a back gear construction associated with said spindle and prime mover, a support for enabling gears of said back gear structure to be shifted toward and away from said spindle, selective means for driving said spindle either directly from said prime mover or through said back gear, and means for preventing power delivery from said prime mover to said spindle during the shifting of said support.

122. A machine tool structure including a rotary supporting spindle, an electric motor for driving said spindle, a reciprocable supporting carriage, a bed for said carriage, a rapid traverse transmission for said carriage, a feed transmission for causing movement of said carriage at various speeds, and control means including remote control mechanism supported by said carriage to govern the control mechanism for starting and stopping said motor and selectively to control the operating effectiveness of said transmissions.

123. A machine tool structure including a rotary supporting spindle, an electric motor for driving said spindle, a reciprocable supporting carriage, a bed for said carriage, a hydraulic rapid traverse transmission for said carriage, a hydraulic feed transmission for causing movement of said carriage at various speeds, and control means including remote control mechanism supported by said carriage to govern the control mechanism for starting and stopping said motor and selectively to control the operating effectiveness of said transmissions.

124. In material working apparatus, a unitary frame structure, a variable delivery pump supported by said frame structure, a variable speed electric prime mover for driving said pump and supported by said frame structure, means for adjusting the stroke of said pump, a constant speed large displacement pump housed within said frame structure, a prime mover for driving said pump, and valve means for controlling the operative effectiveness of said variable delivery pump.

125. In material working apparatus, a bearing structure, a supporting spindle rotatable within said bearing structure, a variable speed prime mover for driving said spindle, and fluid pressure producing means driven in synchronism with said spindle for dispatching a measured amount of lubricant to said bearing structure in timed relation with the speed of said spindle.

ERNEST J. SVENSON.